US012560894B2

(12) United States Patent
Pimenta et al.

(10) Patent No.: US 12,560,894 B2
(45) Date of Patent: Feb. 24, 2026

(54) WEARABLE DEVICE COMPRISING A RECHARGEABLE BATTERY AND ASSOCIATED ELECTRICAL CHARGER

(71) Applicant: Withings, Issy les Moulineaux (FR)

(72) Inventors: Victor Pimenta, Issy les Moulineaux (FR); Manon Navellou, Issy les Moulineaux (FR); Thomas Droze, Issy les Moulineaux (FR); Samuel Clerc, Issy les Moulineaux (FR)

(73) Assignee: WITHINGS, Issy les Moulineaux (FR)

( * ) Notice: Subject to any disclaimer, the term of this patent is extended or adjusted under 35 U.S.C. 154(b) by 394 days.

(21) Appl. No.: 18/488,620

(22) Filed: Oct. 17, 2023

(65) Prior Publication Data

US 2024/0319679 A1 Sep. 26, 2024

(30) Foreign Application Priority Data

Mar. 23, 2023 (EP) .................................... 23163842

(51) Int. Cl.
*G04G 21/02* (2010.01)
*G04B 3/04* (2006.01)
*G04G 19/00* (2006.01)

(52) U.S. Cl.
CPC ........... *G04G 21/025* (2013.01); *G04B 3/041* (2013.01); *G04G 19/00* (2013.01)

(58) Field of Classification Search
None
See application file for complete search history.

(56) References Cited

U.S. PATENT DOCUMENTS

| | | | | |
|---|---|---|---|---|
| 6,396,771 B2 * | 5/2002 | Paratte | G04C 10/00 368/203 |
| 2005/0064751 A1 | 3/2005 | Ferri et al. | |
| 2022/0326779 A1 | 10/2022 | Chung et al. | |

FOREIGN PATENT DOCUMENTS

| | | | | |
|---|---|---|---|---|
| CH | 345 611 A | | 3/1960 | |
| CH | 681267 B5 | * | 8/1993 | G04C 10/00 |
| CN | 106159617 A | | 11/2016 | |
| EP | 1 109 084 A1 | | 6/2001 | |
| EP | 3477403 A2 | * | 5/2019 | G06F 1/1656 |
| KR | 10-2017-0033162 A | | 3/2017 | |
| KR | 20170033162 A | * | 3/2017 | G04C 10/00 |

(Continued)

OTHER PUBLICATIONS

KIPRIS translation of KR-2017-0033162 (Year: 2025).*

(Continued)

*Primary Examiner* — Regis J Betsch
*Assistant Examiner* — Michael James Walker
(74) *Attorney, Agent, or Firm* — Pillsbury Winthrop Shaw Pittman LLP

(57) ABSTRACT

A wearable device configured to be positioned on a user's wrist, includes a rechargeable battery configured to provide energy for the wearable device, the rechargeable battery including a first pole and a second pole, an enclosure, a crown protruding through the enclosure, the crown being a hardware input for the user, and a case back configured to be at least partially in contact with the skin of the wrist, wherein the crown is configured to be electrically connected to the first pole and wherein the enclosure is configured to be electrically connected to the second pole.

20 Claims, 24 Drawing Sheets

(56) References Cited

FOREIGN PATENT DOCUMENTS

| | | | |
|---|---|---|---|
| WO | WO 2019/093637 | A1 | 5/2019 |
| WO | WO 2021/204809 | A1 | 10/2021 |

OTHER PUBLICATIONS

Espacenet combined translation of CH 681267 (Year: 2025).*
Extended European Search Report as issued in European Patent Application No. 23163844.6, dated Sep. 22, 2023.
Extended European Search Report as issued in European Patent Application No. 23163842.0, dated Aug. 29, 2023.

* cited by examiner

WEARABLE DEVICE COMPRISING A RECHARGEABLE BATTERY AND ASSOCIATED ELECTRICAL CHARGER

CROSS-REFERENCE TO RELATED APPLICATIONS

This application claims priority to European Patent Application No. EP23163842.0, filed Mar. 23, 2023, the entire content of which is incorporated herein by reference in its entirety.

FIELD

The present invention relates to a wearable device. The wearable device is in particular a watch, notably a connected watch, or an activity tracker. By watch or activity tracker, it is meant a portable device whose preferred position is at the wrist ("wrist wearable").

The present invention also relates to the field of so-called hybrid connected watches, i.e. connected watches having a visual appearance closer to conventional mechanical watches, in particular thanks to the presence of a gear train as well as mechanical hands to indicate at least the time (hour hand and minute hand).

The present invention also relates to an electrical charger configured to cooperate with such a wearable device to recharge a battery of the device.

BACKGROUND

Conventionally, a wearable device comprises a battery to supply the various components of the device with electrical power. The battery is configured to convert the stored chemical energy into electricity.

The battery may be a rechargeable battery. By providing energy to the rechargeable battery, the electrochemical reaction is reversed to recharge the chemical energy stored in the battery.

The energy used to charge rechargeable batteries usually comes from an electrical charger using AC mains electricity.

Different charging mechanisms are known.

For example, the watch may be placed onto a charger, the case back of the watch and the charger comprising connecting pins cooperating with each other. The watch may be maintained in position onto the charger via magnets, to ensure good mechanical and electrical contact. However, these magnets may disturb the electronics inside the watch and take up space in the internal volume of the watch.

Alternatively, the connecting pins may be arranged on the side wall of the enclosure and the watch may be rotated and placed on the charger so that to exert more pressure. However, the balance of the watch is unstable, and the electrical contact may be easily lost.

Alternatively, document WO2019/093637 describes a watch with connecting pins on the case back and a charger comprising a support surface and charging connectors on a vertical seating surface. The watch is placed on its side on the support surface to recharge its battery.

In another variant, the charger may have the form of a clamp comprising two legs and a spring between the legs. The clamp requires the user to open the legs to enable the cooperation with the pins of the watch, making such a charger tedious to use.

It is also known to provide an inductive charger, for example to charge an Apple Watch. Such a charger uses electromagnetic induction to provide electricity to portable devices wirelessly. However, such a charger may lead to unstable connection between the device and the charger and may face issues as electromagnetic interference or heat generation.

SUMMARY

An aspect of the disclosure is to provide a wearable device enabling an efficient electrical charge while presenting a simpler mechanical and electronic architecture, providing better sealing and watertightness, space saving inside the device and aesthetic impression.

Aspects of the invention are defined in the claims.

To solve at least one of these issues, the disclosure relates to a wearable device configured to be positioned on a user's wrist, the wearable device comprising:

- a rechargeable battery configured to provide energy for the wearable device, the rechargeable battery comprising a first pole and a second pole,
- an enclosure,
- a crown protruding through the enclosure, the crown being a hardware input for the user,
- a case back configured to be at least partially in contact with the skin of the wrist, wherein the crown is configured to be electrically connected to the first pole.

Thanks to this device, the rechargeable battery may be charged through the crown connected to the first pole. No more connecting pins need to be present on the case back and no magnets need to be arranged in the device. The mechanical structure of the device is therefore simplified, enabling an easier manufacturing and saving space inside the device. In addition, the absence of magnets reduces the need for rare earths, reduces the magnetic disturbances, enabling better ECG measures for example and reduces the need for magnetic insulation inside the device. The absence of charging pins in the case back also enables a better sealing as there are less openings in it and provides a better global aesthetic.

In an embodiment, the first pole is the positive pole, the second pole is the negative pole connected to the ground.

In an embodiment, the enclosure is electrically connected to the second pole.

In an embodiment, the enclosure or the case back is configured to be electrically connected to the second pole.

In an embodiment, the bezel is configured to be electrically connected to the second pole. In an embodiment, the crown is a push-button, the crown being configured to switch from a pressed configuration to a rest configuration, the crown being connected to the first pole when the crown is in the rest configuration.

In an embodiment, the crown is disconnected from the first pole when the push-button is in the pressed configuration.

In an embodiment, the crown is permanently connected to the first pole.

In an embodiment, the crown being only connected to the first pole when the push-button is in the pushed configuration.

In an embodiment, the crown comprises a head arranged outside the enclosure and a stem extending through the enclosure, the head and the stem being electrically conductive, the head and the stem being configured to be electrically connected to the first pole.

In an embodiment, the circuit board is electrically arranged between the second pole and the enclosure or the case back or the bezel, the enclosure or the case back or the bezel being directly connected to the circuit board through a conductive contact.

In an embodiment, the device comprises a circuit board electrically arranged respectively between the first pole and the crown, the crown being connected to the circuit board through a flexible printed circuit.

In an embodiment, the circuit board is electrically arranged between the second pole and the enclosure or the case back or the bezel, the enclosure or the case back or the bezel being directly connected to the circuit board through a conductive contact.

In an embodiment, the flexible printed circuit comprises a hook shaped extremity configured to cooperate with the stem to electrically connect the crown to the flexible printed circuit.

In an embodiment, the hook is oriented towards the case back.

In an embodiment, the flexible printed circuit defines an opening in which the stem is configured to be inserted inside to electrically connect the crown to the flexible printed circuit.

In an embodiment, the device comprises a seal configured to electrically isolate the flexible printed circuit from the enclosure.

In an embodiment, the seal is bonded through an adhesive to the enclosure.

In an embodiment, the device comprises a circlip to maintain the flexible printed circuit (FPC) against the seal.

In an embodiment, the device comprises an isolation ring configured to electrically isolate the head of the crown from the enclosure.

In an embodiment, the isolation ring is arranged inside the head of the crown.

In an embodiment, the device comprises an isolation sleeve configured to isolate the stem of the crown from the enclosure.

In an embodiment, the isolation sleeve is arranged around the stem of the crown.

In an embodiment, the crown comprises a glass-to-metal seal.

In an embodiment, the flexible printed circuit is connected to at least one of: an altimeter, an electrocardiogram (ECG) electrode, a temperature sensor, a photoplethysmography (PPG) sensor, and a stem rotation detector.

In an embodiment, the device comprises a battery charging module configured to control the charging of the rechargeable battery and comprising an input port and a battery output port, the crown being connected to the input port and the rechargeable battery being connected to the battery output port.

In an embodiment, the device comprises at least two ECG electrodes and an ECG module, electrically connected to the ECG electrodes and configured to perform an electrocardiogram.

In an embodiment, the case back comprising a first ECG electrode.

In an embodiment, the device comprises a bezel mounted on the enclosure and made of electrically conductive material, the bezel comprising a second ECG electrode.

In an embodiment, the crown forms a first ECG electrode.

In an embodiment, the crown is not an ECG electrode.

In an embodiment, the ECG module is configured to impose a potential on one of the two ECG electrodes and to measure a potential of the other of the two ECG electrodes.

In an embodiment, when the case back is connected to the second pole, the device comprises a switch configured to disconnect the second ECG electrode from the ECG module in the charging configuration.

In an embodiment, the case back comprises a physiological sensor.

In an embodiment, the physiological sensor is a PPG sensor or a temperature sensor.

In an embodiment, the first ECG electrode at least partially surrounds the physiological sensor.

In an embodiment, the enclosure is configured to be electrically connected to the second pole, the case back comprising the first ECG electrode, the bezel comprising the second ECG electrode.

The invention also concerns an assembly comprising a device as defined above and an electric charger, the assembly being configured to switch from a separated configuration in which the charger is away from the device to a charging configuration in which the charger cooperates with the device to electrically charge the rechargeable battery.

The invention also concerns a method of charging with an assembly as defined above, wherein the assembly is initially in the separated configuration, the method comprising the following steps:

switching the assembly from the separated configuration to the charging configuration, electrically charging the rechargeable battery of the device by the charger.

The disclosure relates to a wearable device configured to be positioned on a user's wrist, the wearable device comprising:

a rechargeable battery configured to provide energy for the wearable device, the rechargeable battery comprising a first pole and a second pole, an enclosure, a case back configured to be at least partially in contact with the skin of the wrist, wherein the enclosure is configured to be electrically connected to the second pole.

BRIEF DESCRIPTION OF THE DRAWINGS

These features and benefits of the invention will appear more clearly upon reading the following description, provided solely as a non-limiting example, and done in reference to the appended drawings, in which.

DETAILED DESCRIPTION

In the following description, the notions of "top" and "bottom", "horizontal" and "vertical" are defined in relation to the Z direction. The top is in the direction of the glass and the bottom is in the direction of the case back, which will be described below. The vertical direction is along the Z direction and any horizontal direction is orthogonal to the Z direction.

In the following description, it is to be understood that when an element is referred to as being "connected" or "connected" to another element, it may be directly connected or indirectly connected to the other element, with other elements in between. On the other hand, when an element is referred to as being "directly connected" or "directly connected" to another element, it should be understood that there are no other elements in between.

GENERAL DESCRIPTION

Figure 1:
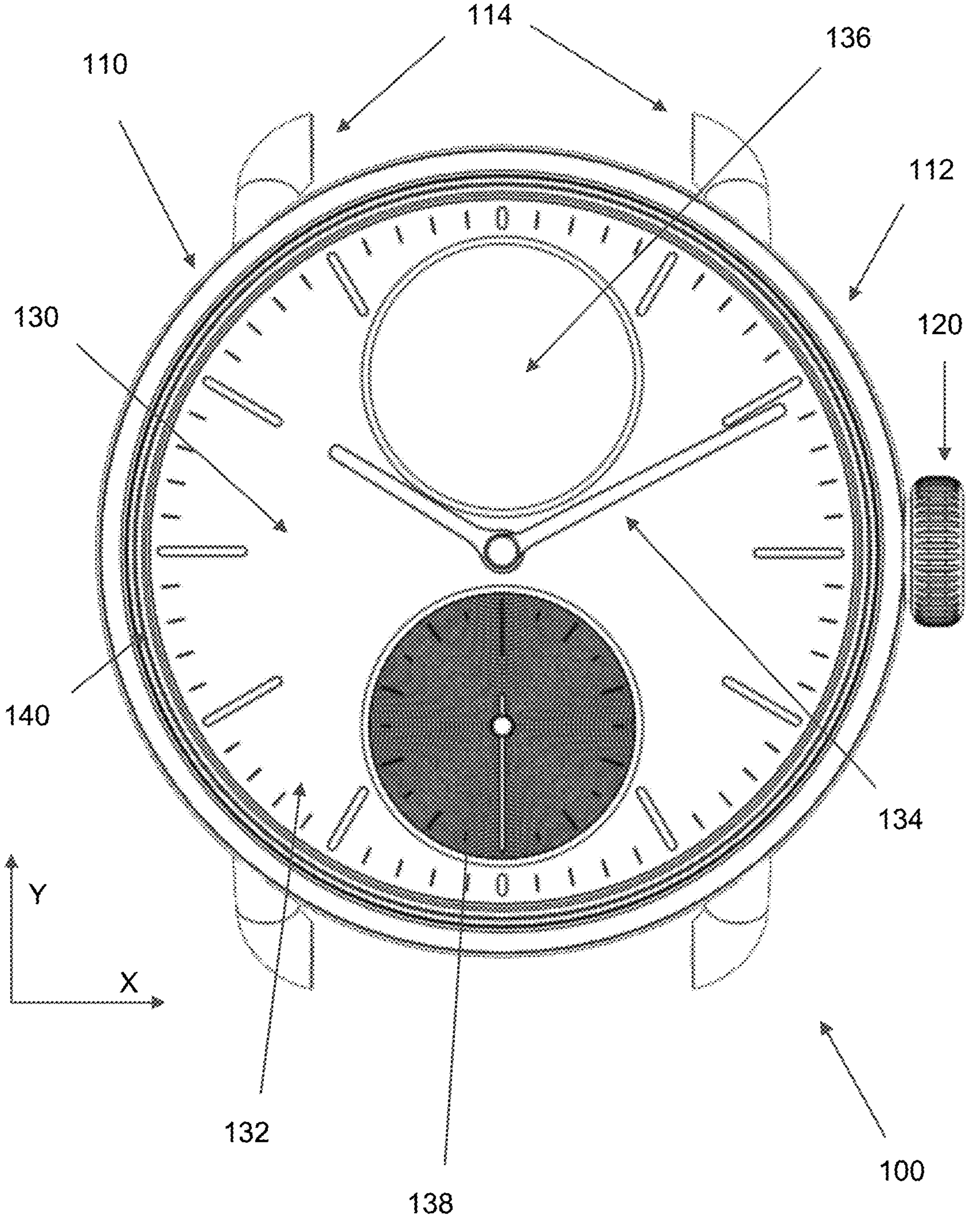
FIG. 1 shows a top view (along a Z direction) of a wearable device according to an embodiment.

A wearable device 100 (also referred as "the device 100" in the following) is represented on FIG. 1. The device 100 is configured to be positioned on a user's wrist. In a particular embodiment, which is the one illustrated, the device is a watch. The watch may comprise a wristband. Nevertheless, in the context of the present description, the term watch does not necessarily include the strap, which is generally manufactured elsewhere and may be assembled at points of sale. The wearable device 100 could also be an activity tracker for example.

In particular, FIGS. 1 to 7 illustrate an electronic watch 100, of the hybrid type with a dial, mechanical hands, and possibly a display integrated into the dial. A standard reference mark (XYZ) is shown in these figures.

In a non-represented variant, the watch may be a non-hybrid watch without mechanical hands but with a display.

Figure 2:
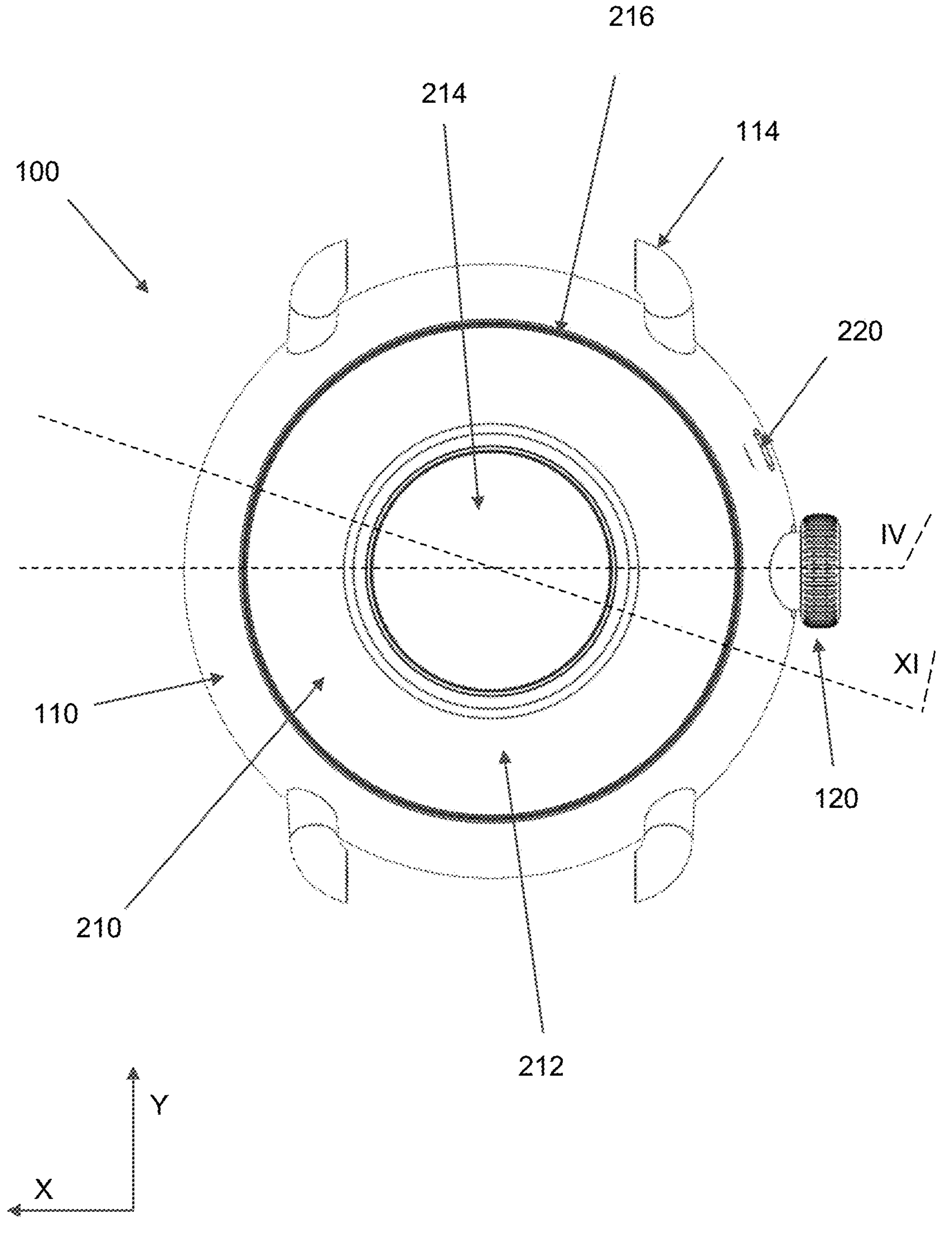
FIG. 2 shows a view from below (along a Z direction) of the wearable device according to an embodiment.

The watch 100 may comprise an enclosure 110 and a case back 210 shown on FIG. 2.

When the device 100 is a watch, the enclosure may also be referred to as a watchcase. The enclosure 110 forms an enclosure that defines an internal volume suitable for receiving various components, such as electronic components, as it will be explained more in details below. The enclosure 110 protects the internal volume from notably dust, water, dampness, and shocks. The enclosure 110 may include a lateral wall 112, which is generally visible when the watch 100 is worn on the wrist. The enclosure 110 may include lugs 114 for attaching a strap (not shown in the figures). In particular, the enclosure 110 may comprise two pairs of lugs 110, on both side of the enclosure 110. The enclosure 110 may include a plurality of parts.

The watch 100 further comprises a crown 120 protruding through the enclosure 110. As visible on FIGS. 1 to 3, the crown protrudes orthogonally to the Z axis, along an X axis. The crown 120 will be described more in detail below.

The case back 210 is the back side of the watch 100. The case back 210 is configured to be at least partially in contact with the skin of the user's wrist. The case back 210 may comprise an annular member 212. The annular member 212 may surround a physiological sensor 214. The physiological sensor 214 will be described more in detail below.

Figure 4:
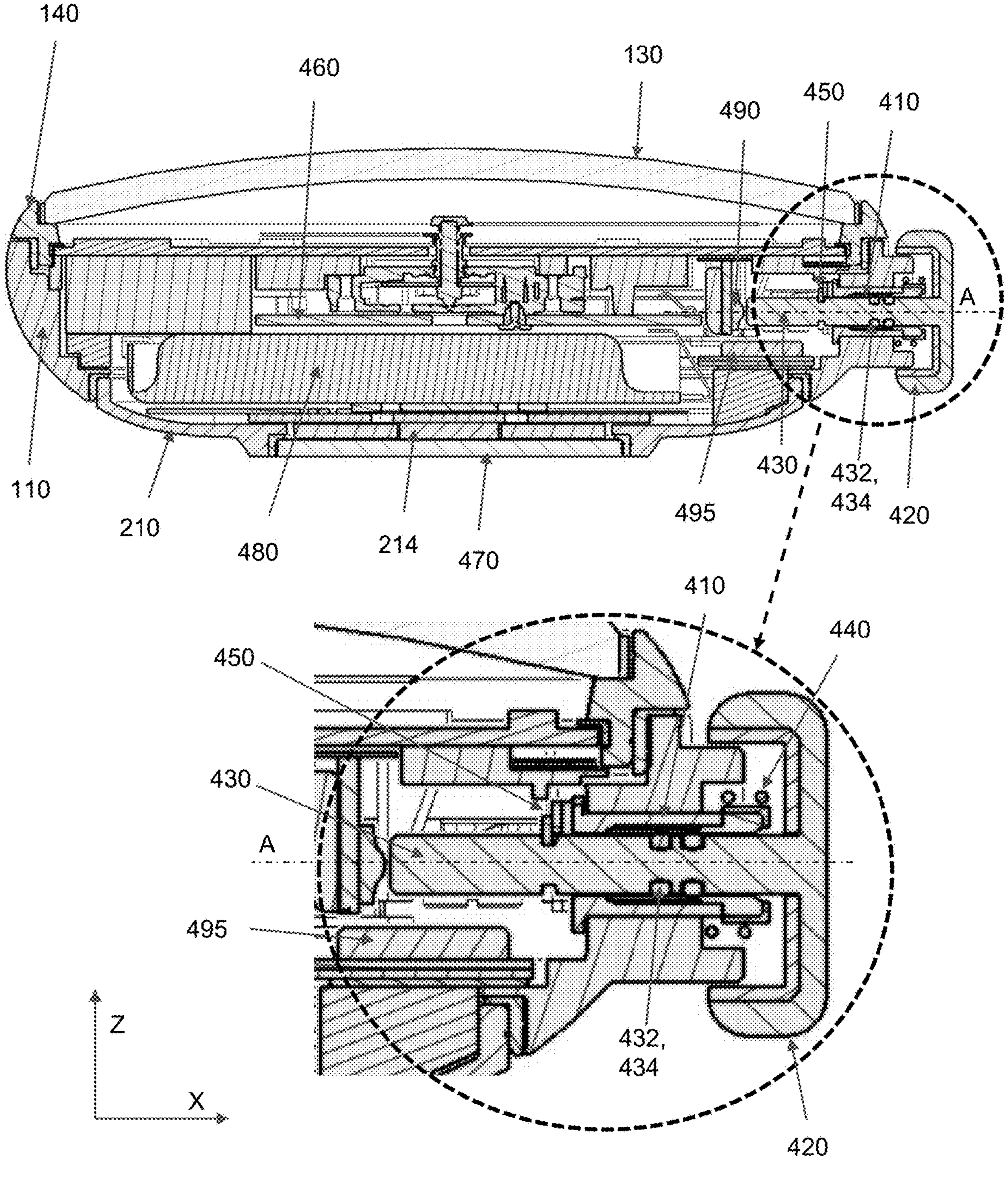
FIG. 4 shows a cross sectional view along the XZ plane of the wearable device of FIG. 2.

In an embodiment illustrated on FIGS. 2 and 4, the enclosure 110 and the case back 210 are two separate pieces. In this embodiment, the enclosure 110 and the case back 210 may be separated by a seal 216.

Figure 3:
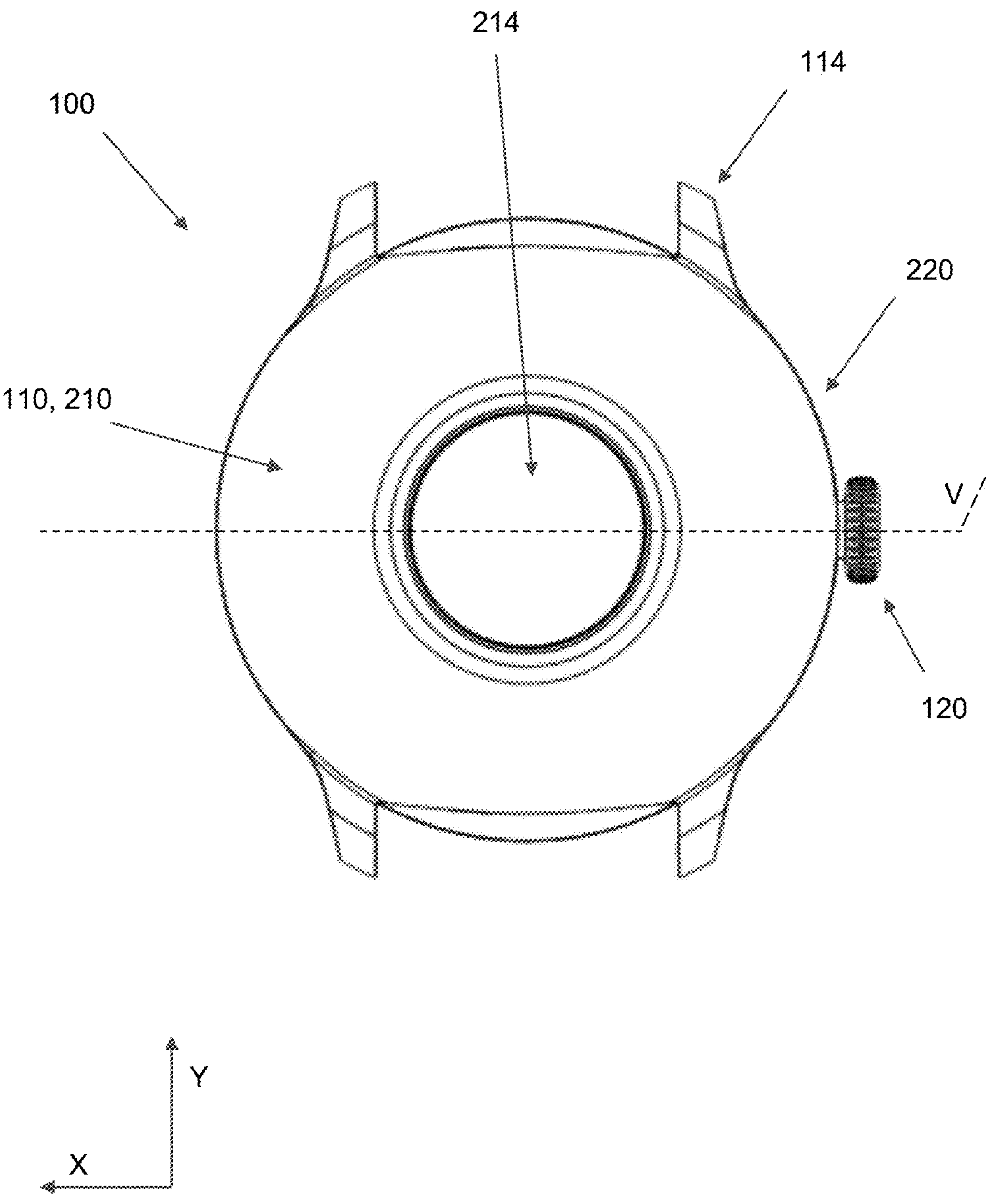
FIG. 3 shows a view from below (along a Z direction) of a wearable device according to another embodiment.
Figure 5:
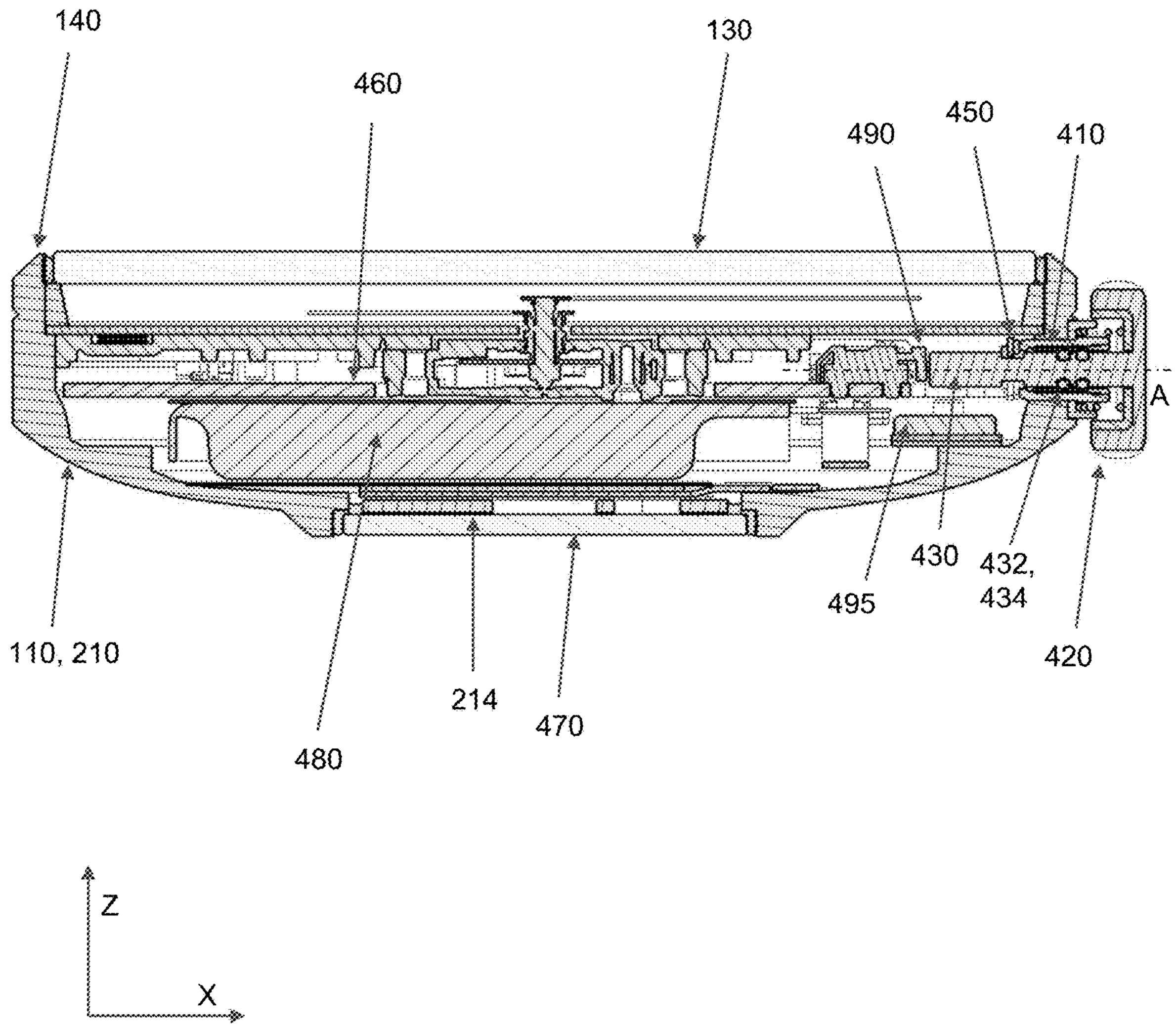
FIG. 5 shows a cross sectional view along the XZ plane of the wearable device of FIG. 3.

In a variant illustrated on FIGS. 3 and 5, the enclosure 110 and the case back 210 are integral with each other. In this embodiment, the enclosure 110 and the case back 210 are a single mechanical piece.

The watch 100 may further include a glass 130, typically mounted on the enclosure 110, such that the glass 130 is fixed. The glass 130 may comprise a typically transparent protective glass and may be made of glass, ceramic, plastic or any transparent material. The outline of the glass 130 is here typically circular in shape.

In the case of a hybrid watch, below the glass 130, the watch 100 further comprises a dial 132 with physical hands 134. The dial 132 may further accommodate a display 136 (e.g., with an opening in the dial that allows a display positioned just below the dial to be visible), which occupies, for example, a small space below or within the dial 132. The watch 100 may further comprise an additional dial 138 for displaying for example the daily number of steps made by the user or another physical activity amount indicator. The glass 130 protects these parts and allows them to be seen through.

In the case of an Apple Watch™-like "smartwatch", non-represented on the Figures, under the glass 130, the watch 100 comprises a screen that occupies a width close to the width of the watch 100. In an embodiment, the screen may display hands. The glass 130 is then the protective glass of the display.

The watch 100 may further comprise a bezel 140, mounted on the enclosure 110. The bezel 140 is positioned around the glass 130 (radially external to the glass around the Z direction). In the illustrated embodiments, the bezel 140 is mounted in a fixed way with respect to the enclosure 110. In a non-represented embodiment, the bezel 140 may be rotatably mounted with respect to the enclosure 110.

Crown

In the illustrated embodiments, the device 100 comprises a unique crown 120. In a non-represented embodiment, the device 100 may comprise a plurality of crowns 120.

The crown 120 is a hardware input for the user. In particular, the crown 120 may be used by the user to set the time, to navigate in the menu displayed on the display 136, to launch the recording of an activity, etc. The crown 120 may a push-button and/or a rotary wheel. In the illustrated embodiment, the crown 120 is a push-button and a rotary wheel, i.e. the crown 120 may be rotated around a crown axis A, parallel to the X axis and may be translated along the crown axis A.

In reference to FIGS. 4 to 7, the crown 120 protrudes through the enclosure 110 along the crown axis A, in particular through the lateral wall 112 of the enclosure 110. To that end, the enclosure 110 comprises an opening 410 through which the crown 120 extends. The opening 410 may present a generally cylindrical shape.

The crown 120 comprises a head 420 arranged outside the enclosure 110 and a stem 430 extending from the head 420 through the enclosure 110. In particular, the stem 430 is configured to slide and/or rotate inside the opening 410.

When the crown 120 is a push-button, the crown 120 is configured to switch from a pressed configuration in which the head of crown 120 is pushed towards the enclosure 110, to a rest configuration in which the head of the crown 120 is further away from the enclosure 110.

As it will be explained more in detail below, the crown 120 is configured to be electrically conductive. In particular, the head 420 and the stem 430 are electrically conductive. For example, the head 420 and the stem 430 may be made of metal.

The crown 120 may further comprise a spring 440 arranged around the stem 430 and between the head 420 and the enclosure 110. The crown 120 is configured to move axially, along the crown axis A, in the opening 410 against the return force of the spring 440, in particular when a push is applied onto the head 420 by the user. In other words, the spring 430 constrained the crown 120 in the rest configuration.

Figure 6:
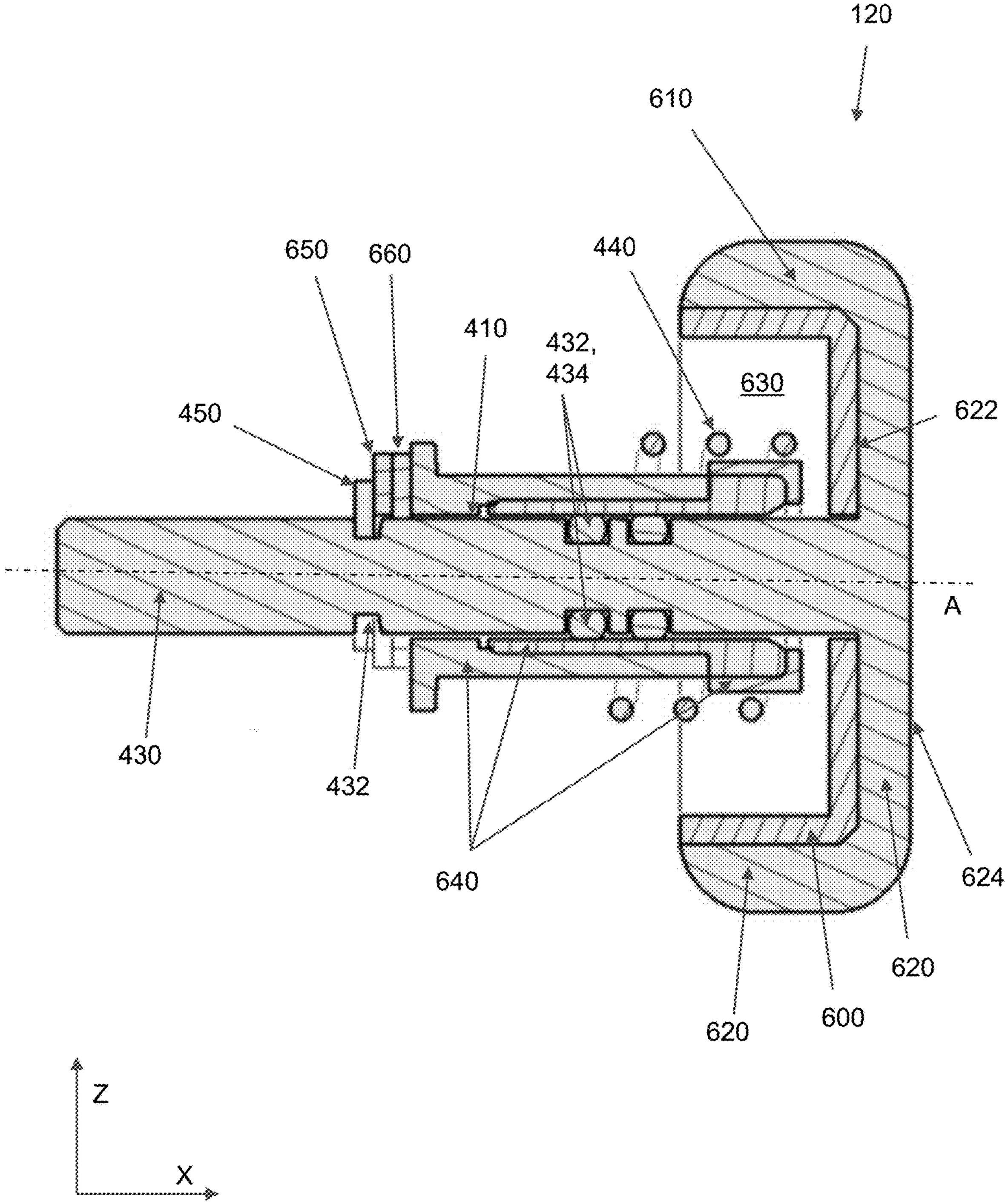
FIG. 6 shows a view of a partial view of a crown cooperating with the enclosure of the wearable device according to an embodiment.

In the embodiment illustrated on FIGS. 4 and 6, the stem 430 comprises an annular groove 432, such as two annular grooves 432, in which at least a sealing gasket 434 is housed. In the embodiment illustrated on FIGS. 5 and 7, two sealing gaskets 434 are arranged directly on the stem 430 without an annular groove. Each gasket 434 provides a water-resistant sealing of the opening 410 when the crown 120 is in the rest configuration or even when the stem 430 slides into it when the crown 120 is activated by a user. Each sealing gasket 434 may be made in rubber, for example nitrile rubber to provide an efficient sealing while provided an extended life span.

The crown 120 may further comprise an abutment 450 which prevents the stem 430 from escaping from the opening 410 in which the stem 430 slides. The abutment that forms a retaining device 450 may be a circlip which is engaged in another annular groove 432 arranged on the stem 430, towards the end of the stem 430 opposite to the head 420 (so that it is located inside the enclosure 110). In the rest configuration, the circlip is pressed towards the enclosure 110. The circlip is moved away from the enclosure 110 in the pressed configuration.

The crown 120 may further comprise an isolation ring 600 configured to electrically isolate the head 420 of the crown 120 from the enclosure 110. The isolation ring 600 is made of an electrical insulation material, for example a thermoplastic polyester elastomer. The head 420 comprises a cylinder portion 610 extending along the crown axis A, closed at an end of the cylinder portion 610 by an end wall portion 620. The cylinder portion 610 and the end wall portion 620 define an inner volume 630. The end wall portion 620 comprises an inner surface 622 facing the inner volume 630 and comprises an outer surface 624 configured to be touched by the user when pushing the crown 120. The stem 430 protrudes from the inner surface 622 and extends inside the inner volume 630. The isolation ring 600 may be arranged inside the inner volume 630 of the head 420. In particular, the isolation ring 600 may be arranged against the inner surface 622 of the end wall portion 620. In addition or in variant, the isolation ring 610 may extend against the cylinder portion 610.

The enclosure 110 may further comprise an isolation sleeve 640 configured to electrically isolate the stem 430 of the crown 120 from the enclosure 110. The isolation sleeve 640 is arranged around the stem 430. As illustrated on FIGS. 6 et 7, the isolation sleeve 640 may be formed of a plurality of parts. In a variant (non-represented), the isolation sleeve 640 is made of a single piece. The isolation sleeve 640 extends at least along the length of the opening 410 to ensure an efficient electrical isolation with the enclosure 110. In the embodiment illustrated on FIG. 7, the at least one sealing gasket 434 is surrounded on both side along the crown axis A by two parts of the isolation sleeve 600. The isolation sleeve 640 may be made of thermoplastic, for example polyoxymethylene to ensure an efficient isolation.

In a variant or in complement, the crown 120 may comprise a glass-to-metal seal. In particular, the crown 120 comprises a glass-to-metal seal surrounding the stem 430. The glass-to-metal seal is made by melting glass in contact with the stem, made of metal, to be joined or sealed. Such a seal ensures an enhanced mechanical resistance while guaranteeing good electrical insulation.

When the crown 120 is a push-button, the device 100 may further comprise a pusher detector 490 arranged inside the enclosure 110 at the extremity of the stem 430 and configured to detect the translation of the stem 430. In particular, the stem 430 is away from the pusher detector 490 in the rest configuration and the stem 430 is in contact with the pusher detector 490 in the pressed configuration.

When the crown 120 is a rotary wheel, the device 100 may further comprise a stem rotation detector 495 configured to detect the rotation of the stem 430 along the crown axis A.

Control Unit

The device 100 comprises at least a circuit board 460 (also called PCB for "printed circuit board"). The circuit board 460 is a thin rigid board containing a printed circuit. The circuit board 460 may comprise a ground plane. The ground plane is typically a large area of metal connected to the circuit ground. The circuit board comprises a control unit 800, schematically illustrated on FIG. 8. Other components may also be mounted on the circuit board 460 as it will be explained below.

The control unit 800 is used to control the on-board electronics of the device 100. The control unit 800 may for example include or partially include an ECG module and a PPG module, as it will be explained below.

Connectivity

The device 100 is connected, so that it may exchange data remotely (wirelessly) in a bidirectional way with a terminal, such as a smartphone. The connection may be made via BLUETOOTH® (a short-range wireless technology standard), such as BLUETOOTH® Low Energy (BLE). The watch may also receive data from the terminal (time, alarm data, notifications, etc.).

Figure 8:
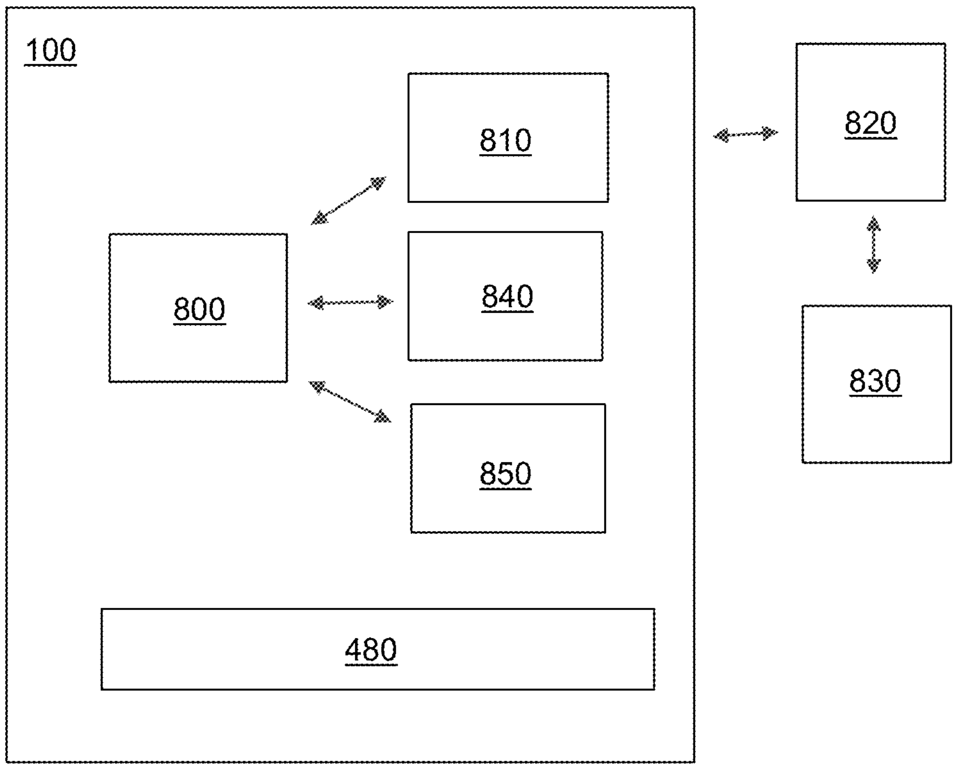
FIG. 8 shows a diagram of the device with some components, especially electronic components.

In reference to FIG. 8, the device 100 comprises a wireless communication module 810, such as a BLUETOOTH® or BLUETOOTH® Low Energy module or a Wi-Fi module or a cellular module (GSM, 2G, 3G, 4G, 5G, Sigfox, etc.), which allows it to communicate bidirectionally with at least one external terminal 820, such as a smartphone. The external terminal 820 may then communicate (bidirectionally) with a remote server 830 for data storage and processing. Alternatively or additionally, the wireless communication module 810 may communicate directly with the remote server 830, such as via the cellular network or via a Wi-Fi network. Data obtained by the watch 100, such as an electrocardiogram, but also indications of heart rate, activity or oxygen saturation, are transmitted to the external terminal 820 via the wireless communication module 810. The control unit 800 may process certain signals before sending them, to limit the size of the transmitted data.

ECG

The device 100 may be configured to measure an electrocardiogram (also called "ECG") of the user.

To retrieve electrical signals generated by the human body, the watch 100 comprises an ECG sensor. In particular, the ECG sensor comprises a set of electrodes (referred to as ECG electrodes) and an ECG electronic module 840, to which the ECG electrodes are electrically connected. By electrode is meant a conductive part capable of receiving an electric current or voltage. The part may be made of a conductive material or comprise a conductive coating. By "conductor" is meant "electrically conductive".

In the illustrated embodiment, the device 100 comprises only two ECG electrodes, referred as ECG1 and ECG2. In a non-represented embodiment, the device 100 may comprise a third ECG electrode, for example arranged on the case back 210.

Figure 9:
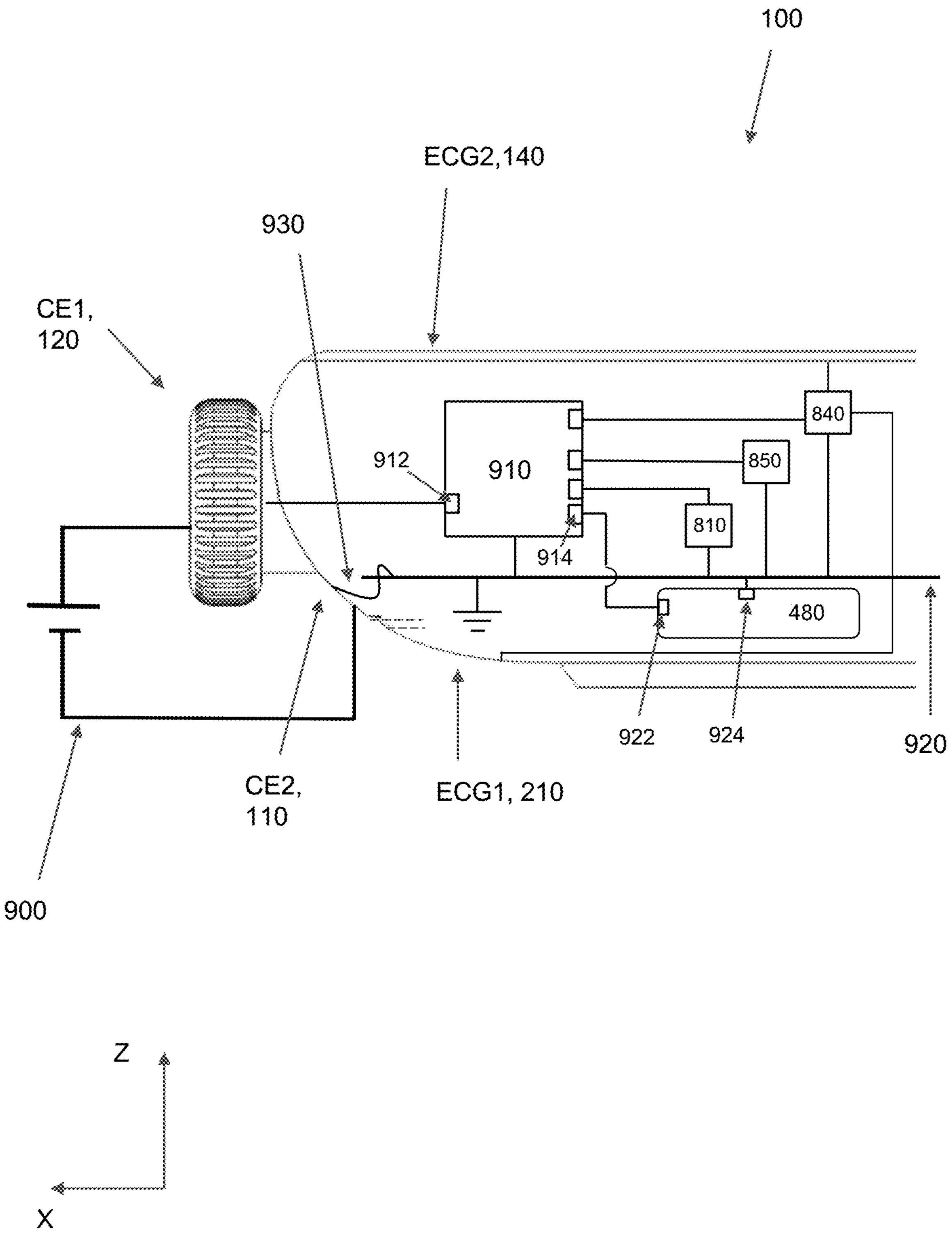
FIG. 9 shows a schematic view of an assembly in the charging configuration according to an embodiment.

As represented on FIG. 9, the first ECG electrode ECG1 is located on the case back 210 so as to be in contact with the skin of the user's wrist on which the user is wearing the watch 100. The first ECG electrode is electrically connected to the ECG module 840. In an embodiment, the case back 210 is the first ECG electrode. In that embodiment, the case back 210 is made of an electrically conductive material, such as metal.

In a variant, the first ECG electrode in arranged on the lens 470, for example with a metallic coating.

The second ECG electrode ECG2 may be arranged on the bezel 140, such that the user may touch any portion of the bezel 140 to perform an ECG. Any portion of the bezel 140 means any portion of the surface of the bezel accessible to a user by touching. In this embodiment, the crown 120 is not an ECG electrode.

In a variant, the second ECG electrode is arranged on the crown 120.

The two electrodes are electrically connected to the ECG module 840. The ECG module 840 is configured for example to impose a potential on one of the two ECG electrodes and to measure a potential of the other of the two ECG electrodes.

The ECG module 840 is configured to retrieve electrical signals from the human body and to, after processing, generate an electrocardiogram signal or a datum representative of information about the electrocardiogram. The ECG module 840 may be mounted on the circuit board 460.

Physiological Sensor

The physiological sensor 214 is arranged on the case back 210. The first ECG electrode may at least partially surround the physiological sensor 214.

The physiological sensor 214 may be an optical sensor. The optical sensor is typically a PPG (photoplethysmography) sensor, comprising light-emitting diodes (LEDs) to emit light and photodiodes to recover light. The optical sensor may be positioned behind a lens 470, such as a glass lens, which interfaces with the skin of the wrist. PCT/EP2021/058955, in the name of Withings™, and incorporated herein by reference, describes in detail the optical sensor, which is found on the Withings ScanWatch™.

The optical sensor is connected to a PPG module 850, which may be mounted on the circuit board 460. The PPG module 850 is configured to generate the instructions for the LEDs and to recover the electrical signals from the photodiodes.

In a variant or in complement, the physiological sensor 214 may be a temperature sensor configured to measure skin temperature. The temperature sensor may be a thermistor sensor or an infrared thermal sensor.

Altimeter

The device 100 may further comprise an altimeter. The altimeter may be a barometer configured to measure the pressure of the air in a cavity fluidically connected with the outside through openings 220 in the enclosure 110 visible on FIG. 2.

Battery

The device 100 further comprises a rechargeable battery 480 configured to provide energy for the device 100, and in particular for the electronic components of the device 100.

The rechargeable battery 480 is configured to store chemical energy and to convert this chemical energy into electrical energy. The battery 480 is configured to be recharged a plurality of times, i.e. reversing the electrochemical reaction to recharge the chemical energy stored into the battery 480. To that end, the device 100 is configured to cooperate with an electrical charger 900, as visible on FIGS. 14 to 20 and as it will be explained below.

The battery 480 may be for example a Lithium Ion battery or a Lithium Polymer battery. The tension delivered by the battery 480 is for example comprised between 3V and 5V, notably 4.35V.

Figure 10:
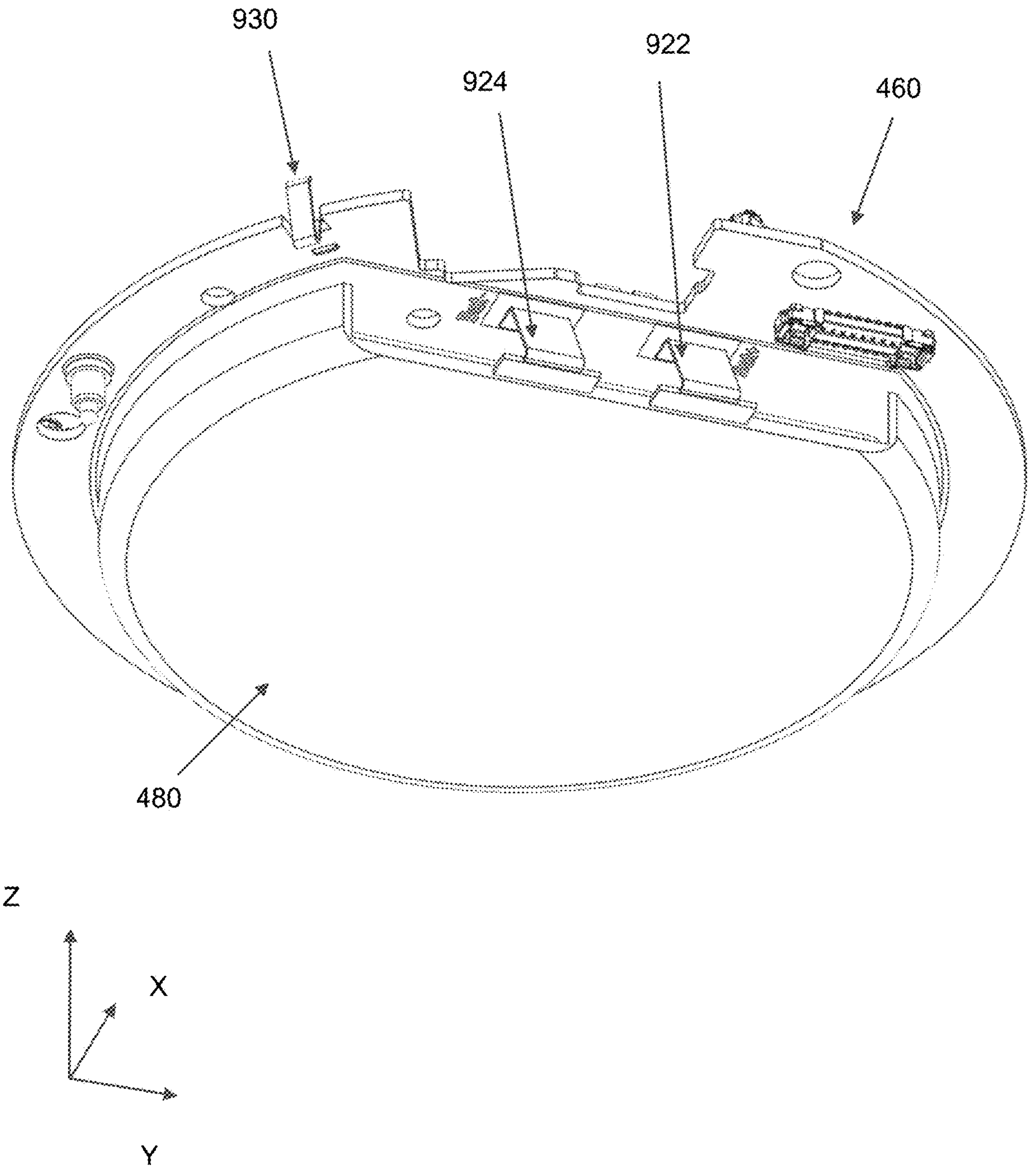
FIG. 10 shows a three-dimensional view of the battery and the circuit board of the wearable device according to an embodiment.

The battery 480 may be arranged between the circuit board 460 and the case back 210. As illustrated on FIG. 10, the battery 480 has in the illustrated a button shape but may also present a parallelepiped shape.

The device 100 further comprises a battery charging module 910 configured to control the charging of the rechargeable battery 480. As schematically illustrated on FIG. 9, the battery charging module 910 comprises an input port 912 and a battery output port 914. The crown 120 is connected to the input port 912 and the battery 480 is connected to the battery output port 914. The charging module 910 is further configured to prevent electrical current to circulate from the battery 480 towards the crown 120, and as a consequence, prevent the user from receiving electrical current from the battery 480. The battery charging module 910 is further connected to the ground of the device 100, in particular to the ground plane 920 of the circuit board 460.

As represented on FIG. 9, the charging module 910 comprises other outputs to deliver electrical energy from the battery 480 to the different electronic components of the device 100. In particular, the charging module 910 is configured to notably power the wireless communication module 810, the ECG module and the PPG module 850.

The battery 480 comprises a first pole 922 and a second pole 924. In the following, the first pole 922 is the positive pole and the second pole 924 is the negative pole. The first pole 922 has in this case a higher electrical potential than the second pole 924. However, in a variant, the poles of the battery 480 may be inverted.

The crown 120 serves here as a charging electrode CE1 (i.e. a physical interface) with the electrical charger 900 for the conduction of electricity from the electrical charger 900 to the battery 480 (in other words, the crown 120 is on the electrical path between the charger 900 and the battery 480). To that end, the crown 120 is made of an electrically conductive material, such as metal.

In the embodiment illustrated on FIG. 9, the enclosure 110 is electrically connected to the second pole 924, so that the enclosure 110 serves as charging electrode CE2 (i.e. physical interface) with the electrical charger 900 for the conduction of electricity from the electrical charger 900 to the battery 480 (in other words, the enclosure 110 is on the electrical path between the charger 900 and the battery 480). To that end, the enclosure 110 is made of an electrically conductive material, such as metal.

In a variant, the case back 210 is electrically connected to the second pole 924. In another variant, the bezel 140 is electrically connected to the second pole 924. In the following, the embodiment with the second pole 924 connected to the enclosure 110 will be described in detail. This description may be adapted in a similar way to the embodiment with the second pole 924 connected to the case back 210 or to the bezel 140. In the embodiment in which the case back 210 is connected to the second pole 924, the device 100 comprises a switch configured to disconnect the first ECG electrode ECG1 from the ECG module 840 when the battery 480 is charging. In the embodiment in which the bezel 140 is connected to the second pole 924, the device 100 comprises a switch configured to disconnect the second ECG electrode ECG2 from the ECG module 840 when the battery 480 is charging.

The circuit board 460 may be electrically arranged respectively between the first pole 922 and the crown 120, and between the second pole 924 and the enclosure 110, so as to control the charge of the battery 480. In particular, in reference to FIG. 9, the enclosure 110 is directly connected to the ground of the device 100, i.e. to the ground plane 920, and the second pole 924 is directly connected to the ground of the device 100, in particular to the ground plane 920. As a consequence, the enclosure 110 and the second pole 924 are both connected to the ground plane 920 and therefore are connected with each other.

Figure 11:
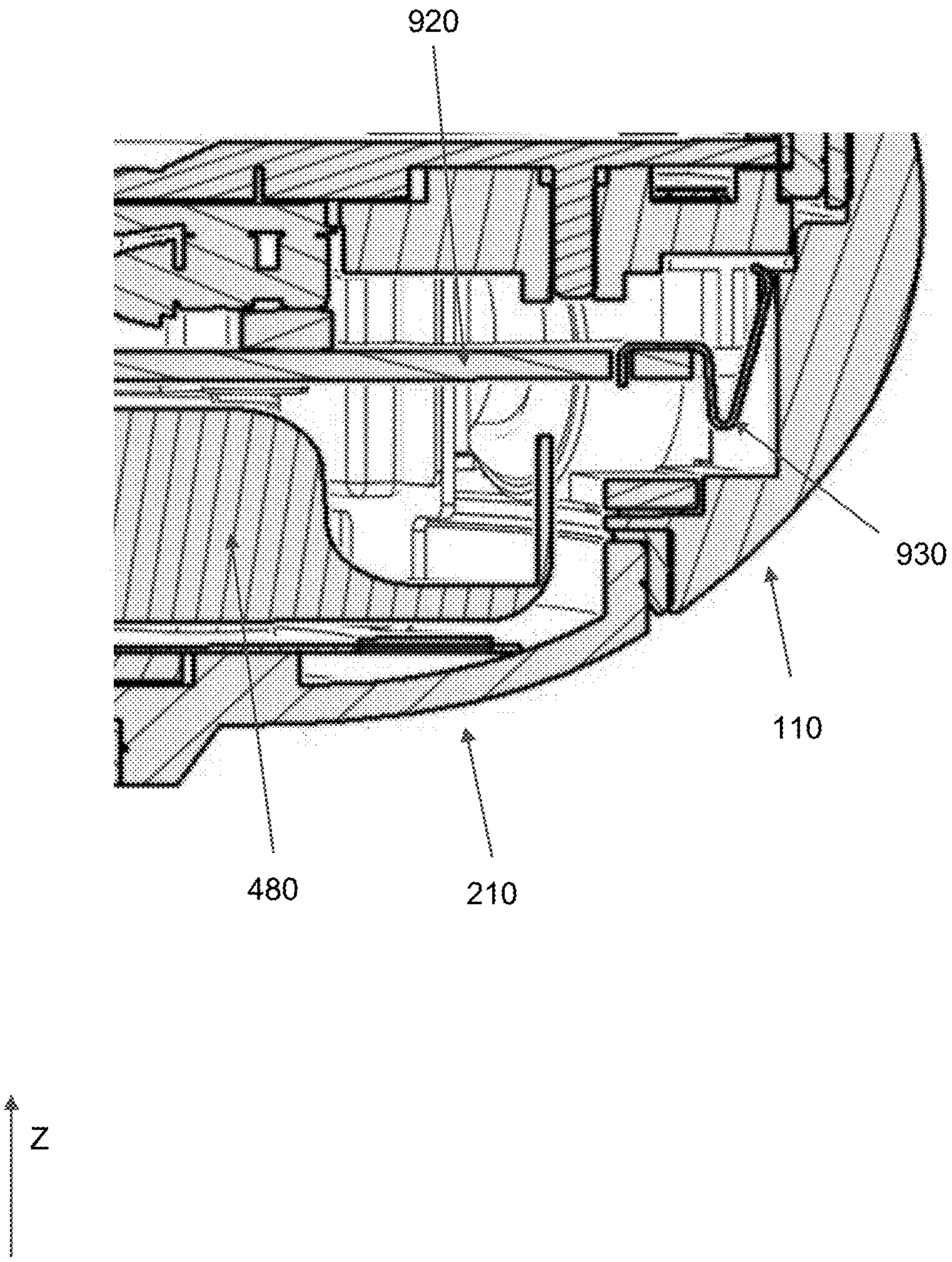
FIG. 11 shows a partial cross sectional view of the device of FIG. 2 along a different plan than FIG. 4.

As visible on FIGS. 9 and 11, the enclosure 110 is connected to the ground plane 920 through a conductive contact 930, in particular a metallic conductive contact 930. In the illustrated embodiment, the conductive contact 930 is a metallic spring, notably a fat spring fixed at one end to the ground plane 920 and comprising a free V-shaped opposite end. The opposite end is folded and constrained towards the enclosure 110. In a non-represented variant, the conductive element 930 may be a metallic pin.

In the embodiment illustrated on FIG. 5, as the enclosure 110 and the case back 210 are integral, the enclosure 110 and the case back 210 are both electrically connected to the second pole 924.

In the embodiment in which the case back 210 is not integral with the enclosure 110, the case back 210 may be electrically connected to the second pole 920 in a non-represented embodiment. In particular, the case back 210 is directly connected to the ground of the device 100, i.e. to the ground plane 920, and the second pole 924 is directly connected to the ground of the device 100, in particular to the ground plane 920. The case back 210 is connected to the ground plane 920 through a conductive contact 930.

When the crown 120 is a push-button, the crown 120 may be connected to the first pole 922 of the battery 480 when the crown 120 is in the rest configuration. The crown 120 may be disconnected from the first pole 922 when the crown 120 is in the pressed configuration.

In a variant, the crown 120 may be permanently connected to the first pole 922. In another variant, the crown 210 may only be connected to the first pole 922 when the crown 120 is in the pressed configuration.

The first pole 922 and the second pole 924 are configured to be connected to the electrical charger 900 to recharge the battery 480. In particular, the charger 900 is configured to be in electrical contact with the crown 120 and with the enclosure 110 (or the case back 210) to charge the battery 480.

As visible on the Figures, no connecting pins are arranged on the enclosure 110 or the case back 210. The mechanical structure of the device 100 is therefore simplified, enabling an easier manufacturing and saving space inside the device 100. The absence of charging pins, usually as cylindrical inserts in the case back or the enclosure, in the also improves the watertightness as there are fewer openings and provides a better global aesthetic of the device 100.

Moreover, no magnets are arranged in the inner volume of the device 100. This absence of magnets reduces the need for rare earths, reduces the magnetic disturbances, enabling better ECG measures for example, reduces the need for magnetic insulation inside the device and therefore lightens the device 100, while diminishing the thickness thereof.

FPC

Figure 12:
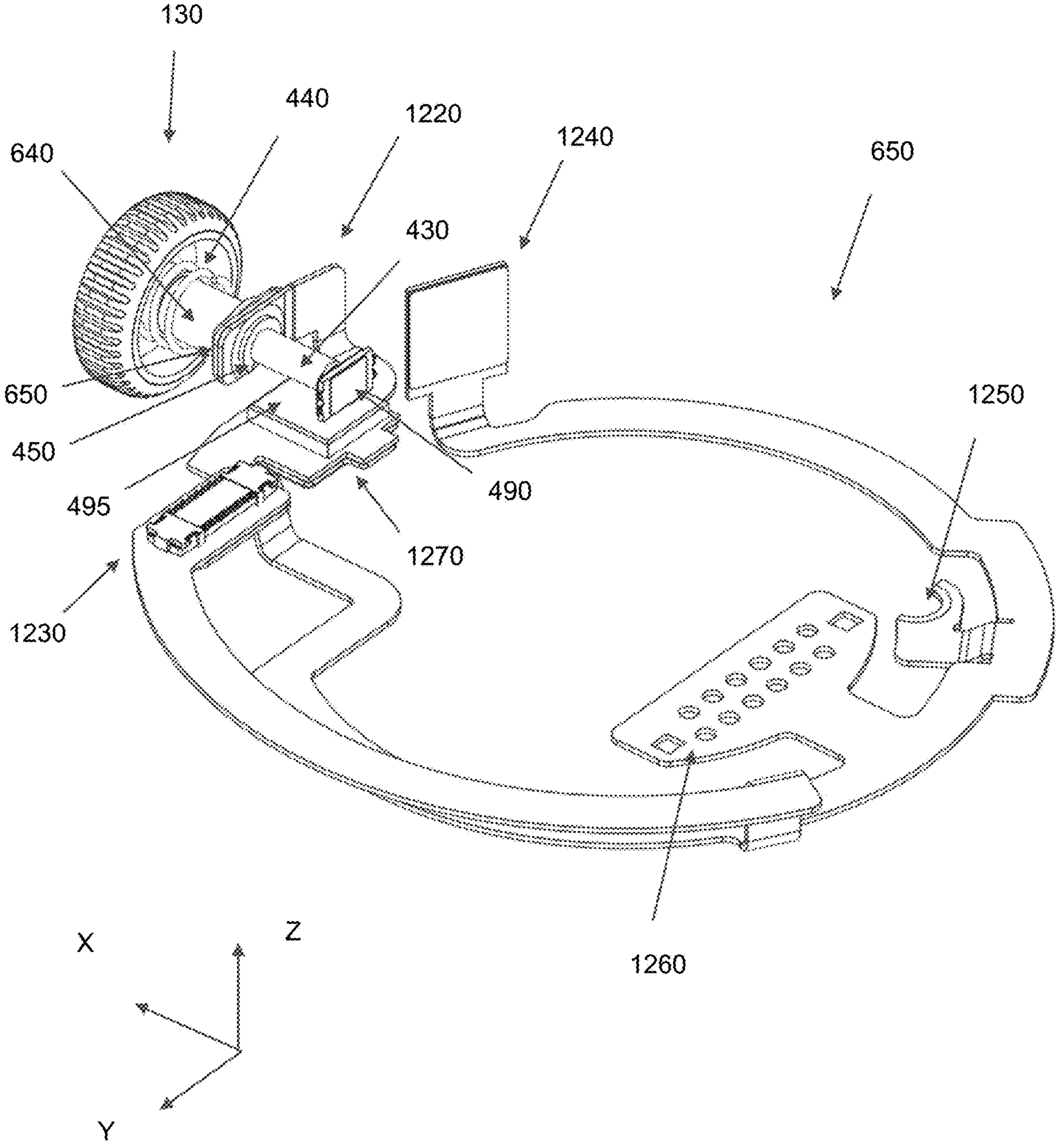
FIG. 12 shows a three-dimensional view of the crown and the flexible printed circuit of the wearable device according to an embodiment.

As represented on FIG. 12, the crown 120 is connected to the circuit board 460, and especially to the battery control module 910, through a flexible printed circuit 650 (also called "FPC"). The FPC 650 comprises a metallic layer of traces, usually copper, bonded to a dielectric layer, usually polyimide. The thickness of the metal layer may be comprised between 0.001 mm to 0.01 mm and the dielectric thickness may be comprised between 0.01 mm to 0.2 mm. An adhesive may be used to bond the metal to the substrate, but other types of bonding such as vapor deposition may be used to attach the metal. The FPC 650 may bend without cracking or breaking enabling an easier assembling of the device 100 during the manufacturing process.

Figure 13:
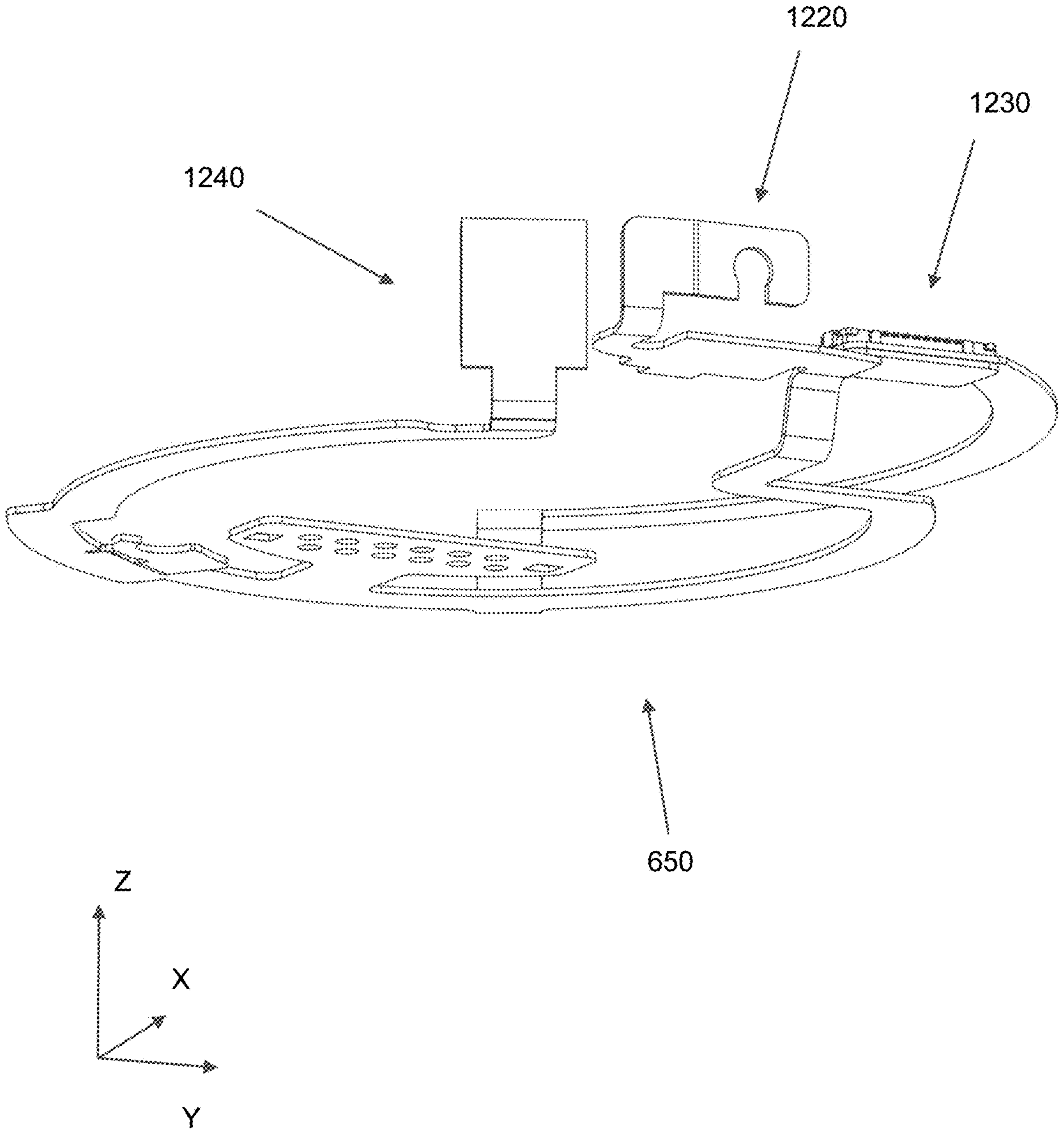
FIG. 13 shows a three-dimensional view of the flexible printed circuit of FIG. 12.

As visible on FIGS. 12 and 13, the FPC 650 extends generally along a circle shape and comprises at least two branches, in particular three branches extending respectively until a first end 1220, a second end 1230 and beneficially a third end 1240. The FPC 650 is directly connected to the crown 120 at the first end 1220. The FPC 650 is directly connected to the circuit board 460. As a consequence, the FPC 650 connects the crown 120 to the circuit board 460.

The FPC 650 may be further connected to at least one of: the altimeter, one of the ECG electrodes, the temperature sensor, the optical sensor, the stem rotation detector. In particular, in the illustrated embodiment of FIGS. 12 and 13, the FPC 650 is connected to the altimeter at the third end 1240, to the second ECG electrode at connection 1250, to the optical sensor at connection 1260 and at the stem rotation detector 495 at connection 1270.

The FPC 650, and in particular the first end 1220, comprises a hook shaped extremity configured to cooperate with the stem 430 (i.e. partially surrounding it) to electrically connect the crown 120 to the FPC 650. As visible on FIG. 13, the hook is oriented towards the case back 210. In other words, the first end 1220 extends along a vertical plan and comprises a slot facing the case back 210 for receiving the stem 430. In a non-represented variant, the FPC 650 defines a disc opening at the first end 1220 in which the stem 430 is inserted to electrically connect the crown 120 to the FPC 650.

Figure 7:
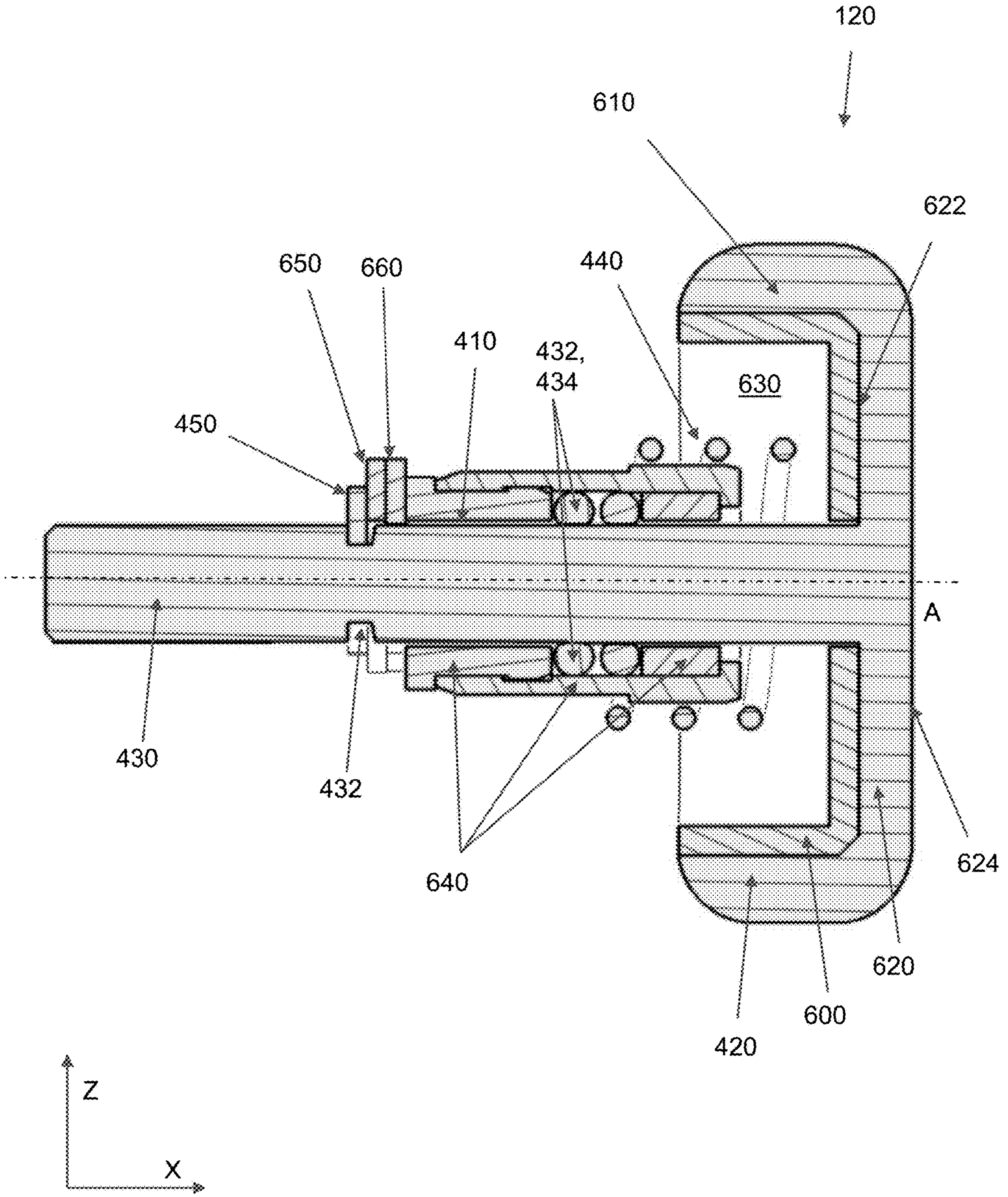
FIG. 7 shows a view of a partial view of a crown cooperating with the enclosure of the wearable device according to another embodiment.

In reference to FIGS. 6 and 7, the device 100 further comprises a seal 660 configured to electrically isolate the FPC 650, in particular the hook arranged at the first end 1220, from the enclosure 110. The seal 660 may be bonded through an adhesive to the enclosure 110, in particular to the isolation sleeve 630 of the enclosure 110. The abutment 450 is configured to maintain the FPC 650, in particular the hook, against the seal 660.

When the crown 120 is pushed by the user, the stem 430 translates along the crown axis A and the abutment 450 moves with the stem 430. As the seal 660 is bonded to the enclosure 110, the seal 660 does not move with the stem 430. The hook of the FPC 650 remains in contact with the seal 660 and does not move with the stem 430. Vibration tests have been carried out by the inventors which show that it seems to be no risk for the hook to dissociate with the stem 430 in operation of the watch.

ECG Wearable Device

As already described above, the device 100 includes an enclosure 110, a case back 210, a bezel 140 and a crown 120. As disclosed above, In an embodiment, the case back 210 and the bezel 140 are ECG electrodes ECG1, ECG2 and the crown 120 and the enclosure 110 are charging electrodes CE1, CE2. This arrangement drastically simplifies the conception of the device 100, as none of those electrodes requires the additional of the specific independent part of the device 100. Electrical sealing is however required between the four electrodes ECG1, ECG2, CE1, CE2.

Charger

Figure 14:
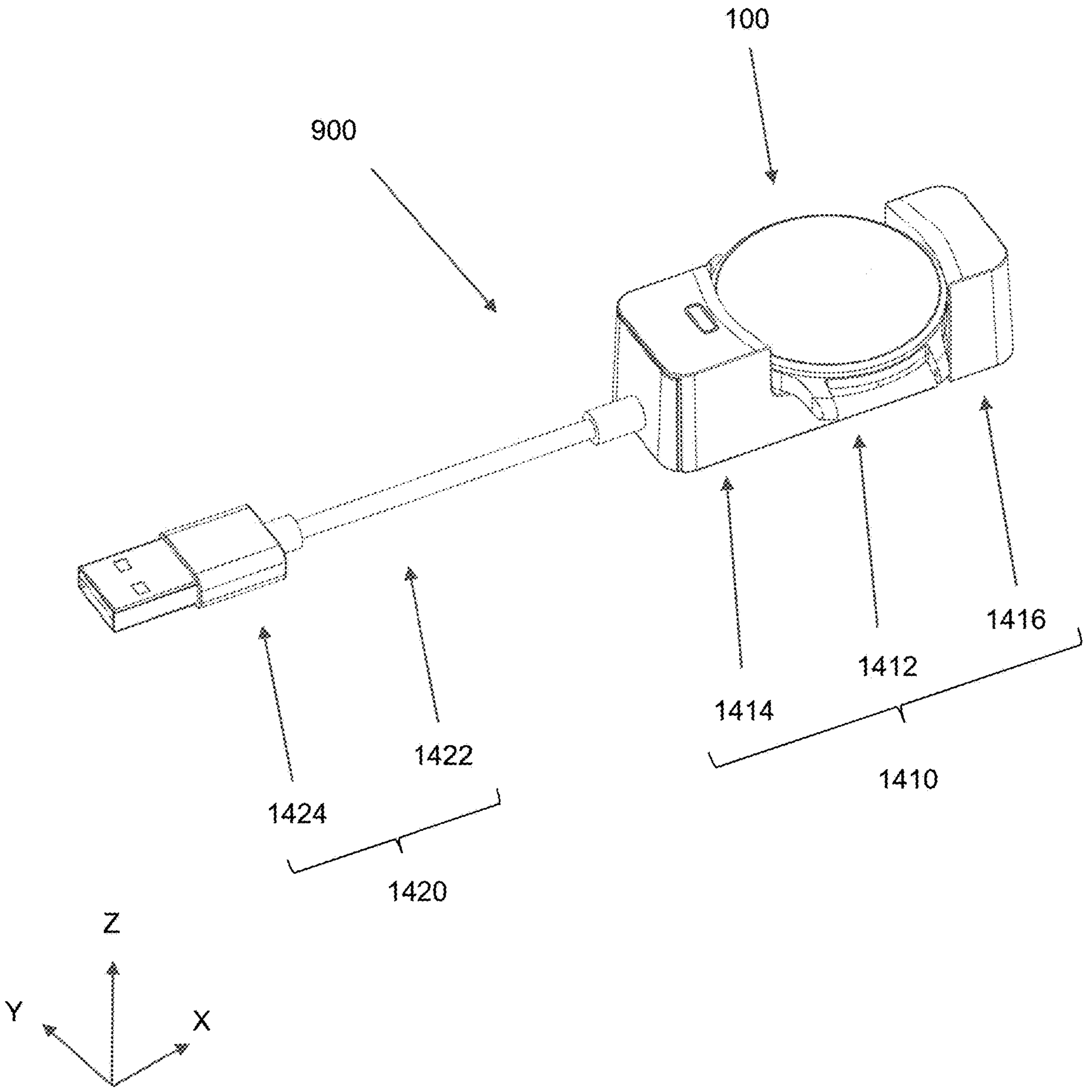
FIG. 14 shows a three-dimensional view of an assembly in the charging configuration according to an embodiment.
Figure 18:
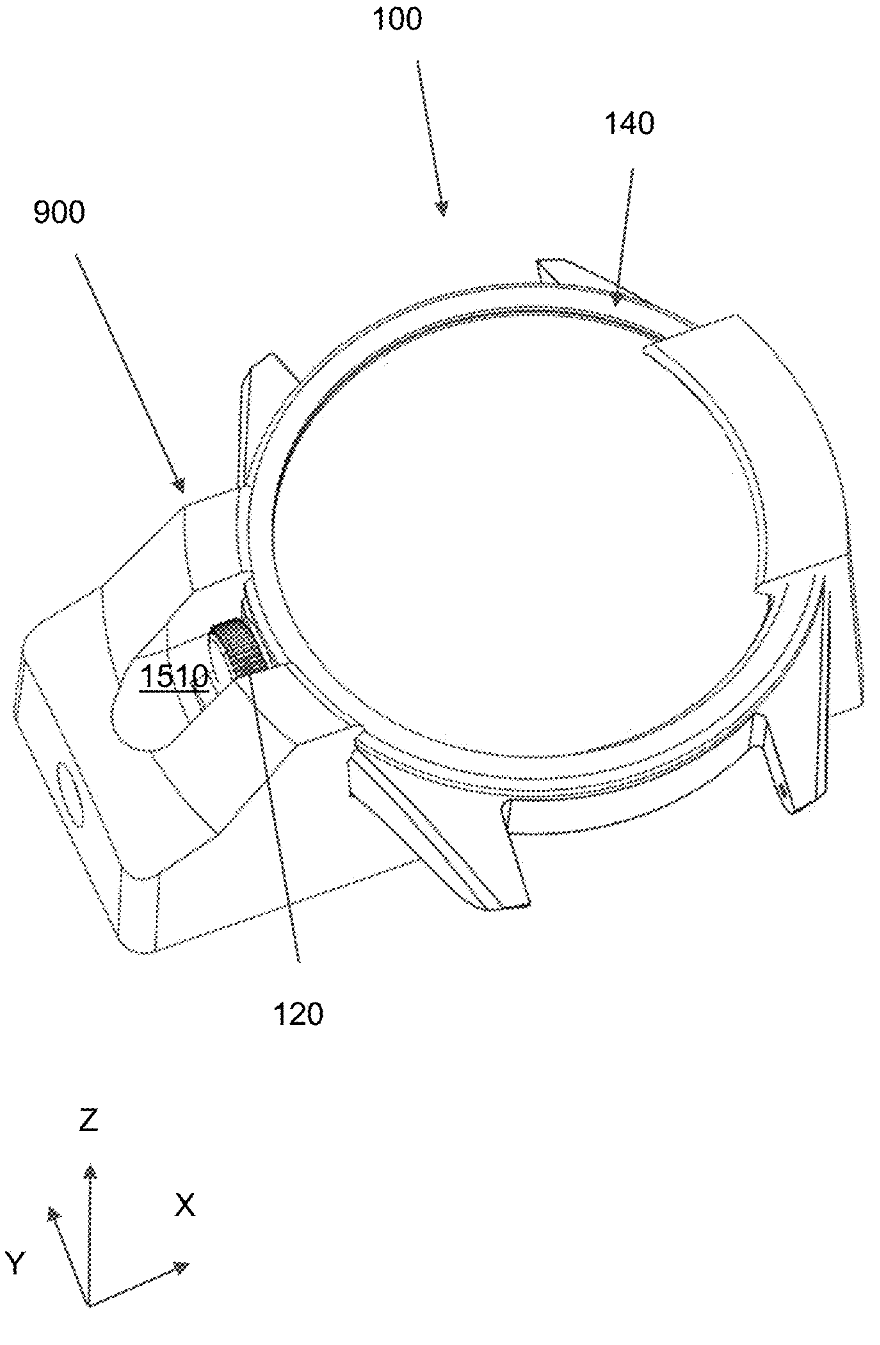
FIG. 18 shows a three-dimensional view of an assembly in the charging configuration according to another embodiment.

An assembly comprising a device 100 and an electric charger 900 is illustrated on FIGS. 14 and 18. Eight different embodiments of the electric charger 900 are respectively illustrated on FIGS. 14-16, FIG. 17, FIGS. 18-19, FIG. 20, FIG. 21, FIG. 22, FIG. 23 and FIG. 24.

The assembly is configured to alternate between a separated configuration and a charging configuration. In the separated configuration, the charger 900 is away from the device 100. In the charging configuration, illustrated on FIGS. 14 and 16, the charger 900 cooperates with the device 100 to electrically charge the rechargeable battery 480 (when the charge 900 is plugged).

In particular, when the user wears the watch 100 at the wrist, the assembly is in the separated configuration. The charger 900 may rest on a table and when the battery 480 is empty, the user may grab and couple the device 100 to the charger 900 to alternate to the charging configuration in order to recharge the battery 480.

The charger 900 may extend along a length comprised between 2 cm and 10 cm, along the X axis. The charger 900 may extend along a width comprised between 1 cm and 4 cm, along the Y axis. The charger 900 may extend along a height comprised between 1 cm and 3 cm, along the Z axis.

The charger 900 comprises a support 1410 and a connection system 1420.

The connection system 1420 may comprise a connection wire 1422 and a plug 1424, notably an USB plug. The connection wire 1422 may be permanently connected to the support 1410 or may be connected in a removable way to the support 1410, for example through an USB connection. The plug 1424 may be connected to an electrical adapter, non-represented, to connect the charger 900 to an electrical network. The plug 1424 may also be directly connected to an external battery.

The support 1410 comprises at least one side wall 1414. The side wall 1414 is configured to engage the wearable device 100 when it is in the charging configuration. In some embodiments, illustrated by FIGS. 14 to 23, the support 1410 also comprises a base 1412, from which the at least one side wall 1414 extends. In some embodiments, illustrated by FIGS. 14 to 16 and 18 to 22, the support 1410 comprises two side walls 1414, 1416 and a base 1412. In some embodiments, illustrated by FIG. 17, the support 1410 comprises a single side wall 1414 and a base 1412. In some embodiments, illustrated by FIG. 24, the support 1410 only comprises the side wall 1414 (and no base 1412). The wall is called "side wall" as it is facing a side of the wearable device 100, notably the lateral wall 112 of the enclosure 110.

Where it engages the wearable device 100, the side wall 1414 may have a shape that is complementary to the shape of the enclosure 110 or at least partially complementary. For example, when the enclosure 110 has a circular shape, the side wall 1414 may also include a curved shape to fit the enclosure 110. To be compatible with different sizes of enclosure, the fit may be more or less loose (for example the radius of the circular shape of the side 1414 may be greater than the radius of the curved shape of the enclosure 110). FIGS. 15-20 and FIGS. 21-22, and FIG. 24 show such a curved side wall 1414.

The base 1412 extends along a horizontal plan, orthogonally to the Z axis. The base 1412 may present a mainly flat parallelepipedic shape. The base 1412 may configured to rest on a flat surface as a table for example. In particular, the base 1412 comprises an upper surface 1610 configured to be in contact with the device 100 and a flat bottom surface 1612 configured to be in contact with an external surface as a table. The base 1412 may extend along a length comprised between 1 cm and 5 cm, along the X axis. The base 1412 may extend along a width comprised between 1 cm and 4 cm, along the Y axis. The base 1412 may extend along a height comprised between a 0.1 cm and 2 cm, along the Z axis.

Figure 23:
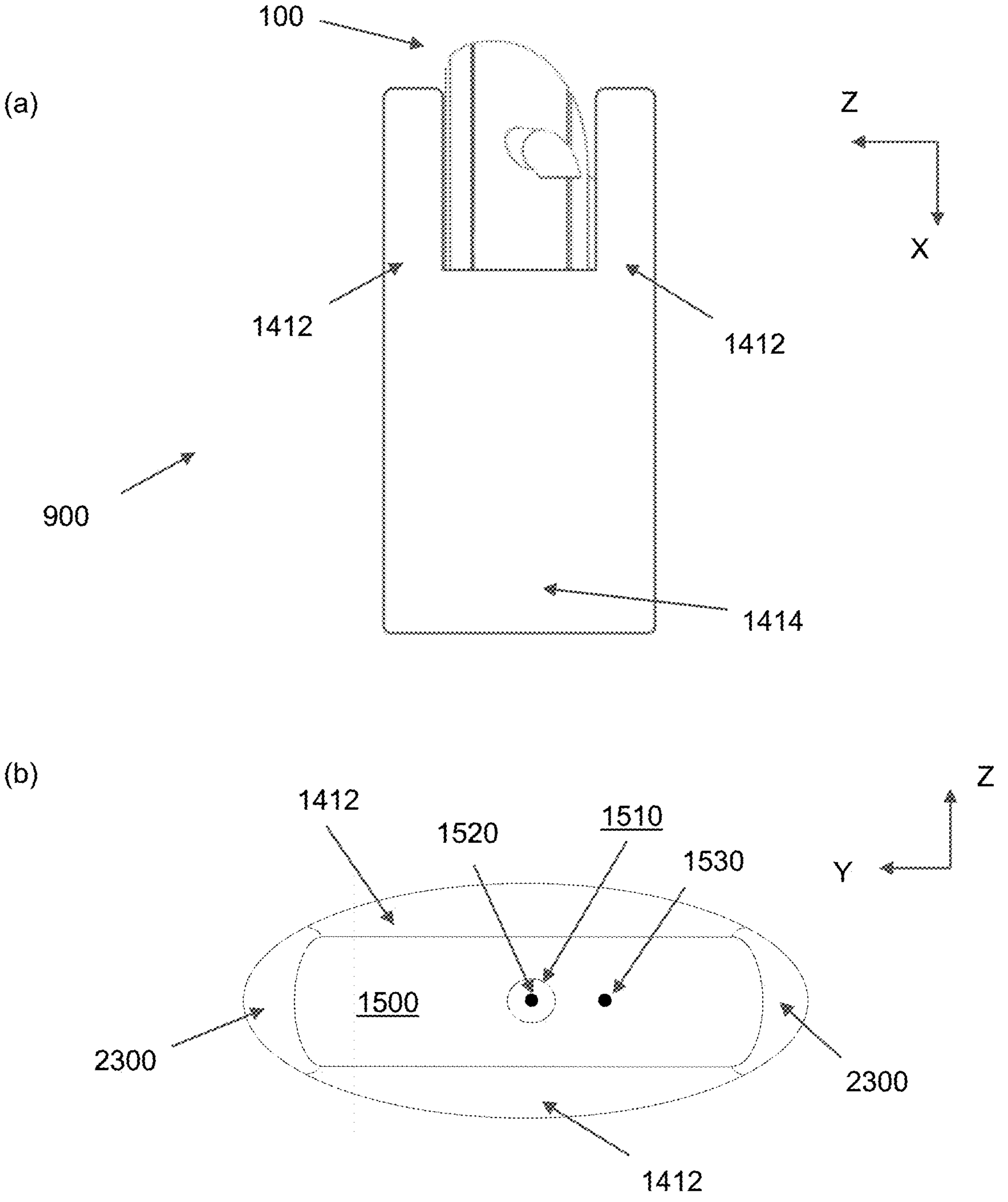
FIG. 23 shows a side view (a) and a top view (b) of the charger of the assembly according to another embodiment.

In a variant illustrated on FIG. 23, at least a side wall 1414 is configurated to rest on a flat surface as a table for example. The charger 900 comprises here two parallel bases 1412 protruding vertically from each side of the side wall 1414. The charger 900 may further comprise two additional walls 2300 protruding vertically from the side wall 1414 and orthogonally to the two bases 1412. The two additional walls 2300 and the side wall 1414 define a watch reception volume into which the wearable device 100 is be inserted.

The two side walls 1414, 1416 face each other and protrude out of the base 1412. In particular, each side wall 1414, 1416 protrudes along a vertical direction, parallel to the Z axis when the assembly is in the charging configuration. The two sides wall 1414, 1416 are arranged at two opposite ends of the base 1412. Each side wall 1414, 1416 may extend along a length comprised between 0.1 cm and 3 cm, along the X axis. Each side wall 1414, 1416 may extend along a width comprised between 1 cm and 4 cm, along the Y axis. Each side wall 1414, 1416 may extend along a height comprised between 1 cm and 3 cm, along the Z axis.

The base 1412 and the two sides walls 1414, 1416 form a watch reception volume 1500 to receive at least partially the device 100. In particular, the device 100 is at least partially inserted inside the watch reception volume 1500 in the charging configuration.

In the variant of FIG. 23, the two bases 1412 and the side wall 1414 defines the reception volume 1500. The reception volume 1500 is configured to receive the device 100 which rest by gravity in the charger.

As visible on FIGS. 14 and 18, the base 1412, and in particular the upper surface 1610 of the base 1412, is configured to be in contact with the case back 210 of the watch 100 in the charging configuration. To that effect, the base 1412 comprises a case back reception area 1505, presenting a complementary shape of the case back 210. The side walls 1414, 1416 are configured to be in contact with the enclosure 110 in the charging configuration. In particular, the side walls 1414, 1416 are configured to contact two opposite sides of the enclosure 110.

In variant or in complement, the base 1412, and in particular the upper surface 1610 of the base 1412, may be configured to be in contact with the glass 130 of the watch 100 in the charging configuration. The charger 1400 is therefore configured to charge the watch 100 in both side (with the case back 210 against the base 1412 or with the glass 130 against the base 1412), enabling an easy and intuitive charging for the user.

Each side wall 1414, 1416 may extend higher along the Z axis than the height of the device 100 in the charging configuration.

Figure 16:
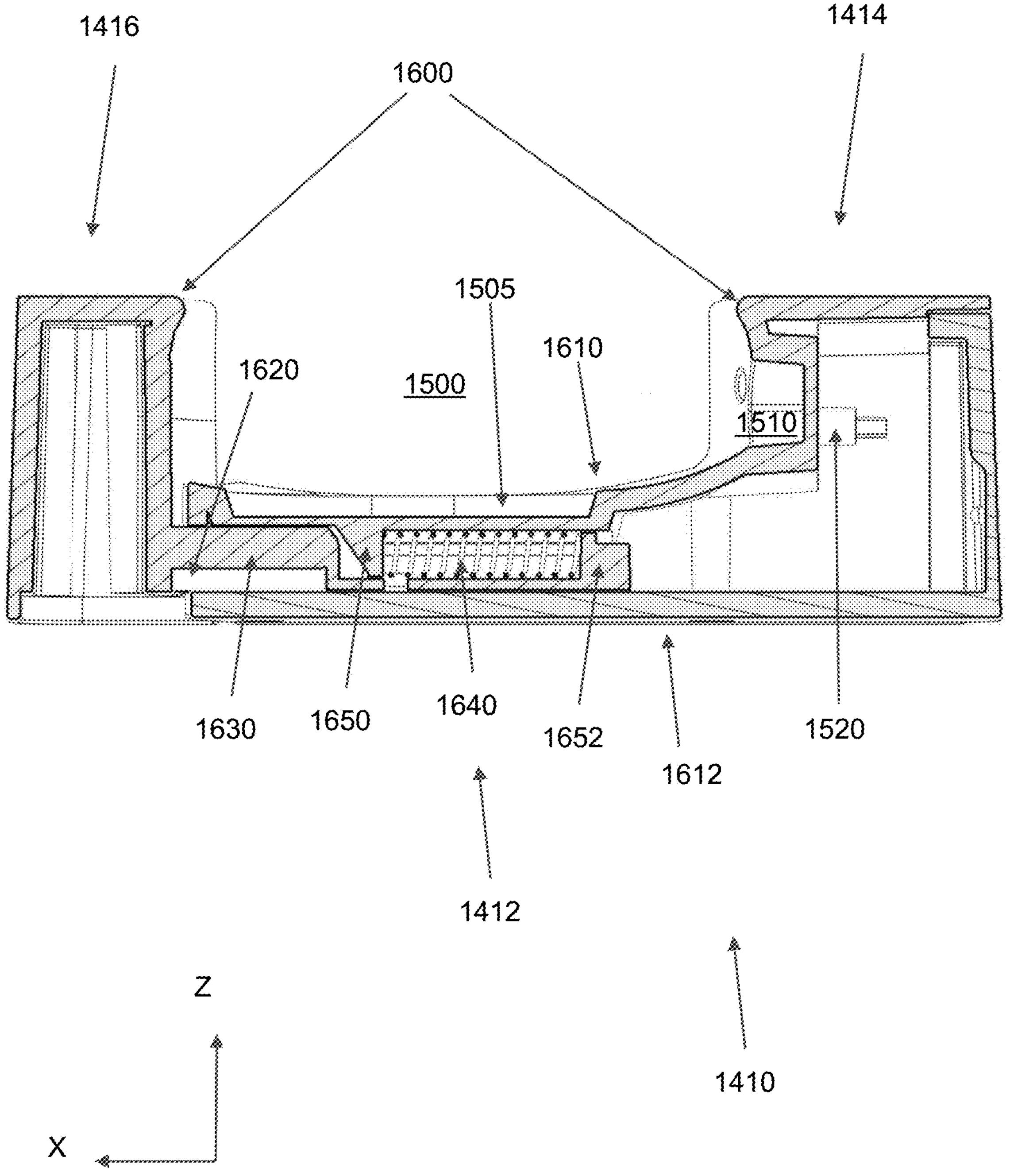
FIG. 16 shows a cross sectional view along the plane XZ of the charger of FIG. 15.
Figure 17:
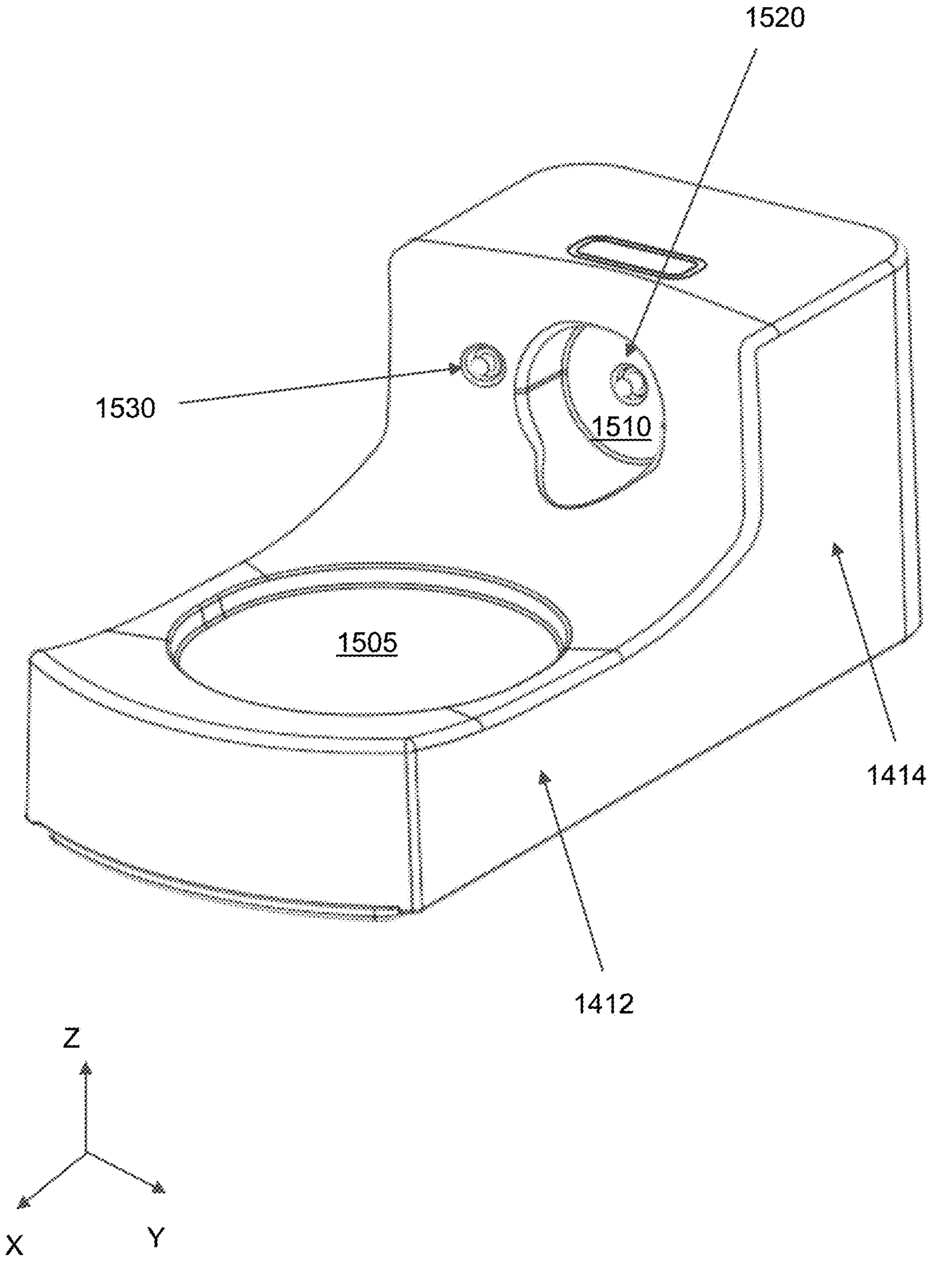
FIG. 17 shows a three-dimensional view of a charger according to another embodiment.

As visible on FIG. 16, each side wall may comprise a rim 1600 configured to cooperate with the bezel 140 of the device 100 in the charging configuration. In particular, the rim 1600 is arranged at the free end of the respective side wall and enables to tightly keep the device 100 in the watch reception volume 1500 in the charging configuration. The rim 1600 slightly closes the watch reception volume 1500.

The side walls may comprise a first side wall 1414 and a second side wall 1416. The connection system 1420 may be arranged on the first side wall 1414.

The watch reception volume 1500 is configured to be extended to receive the device 100. In particular, in the embodiments of FIGS. 14 to 20, at least one side wall is movable to change the watch reception volume. In particular, the movable side wall may have two configurations, one allowing the device to be inserted in the charger 900 and one maintaining the device in the charger 900.

In the embodiments represented on FIGS. 14 to 19, at least one of the side walls is configured to be movable in translation with respect to the base 1412. In particular, in the illustrated embodiments, the second wall 1416 may be the movable side wall. The movable side wall is configured to be movable in translation with respect to the base 1412 along the X axis. As visible on FIG. 16, the base 1412 comprises an opening 1620 and the movable side wall comprises an insert 1630 protruding along the X axis and able to be inserted in the opening 1620. The charger 900 may further comprise a spring 1640 resting between a first stopper 1650 of the base 1410 and a second stopper 1652 of the insert 1630. In particular, the charger 900 may comprise two springs 1640 arranged in parallel along the X axis. The spring 1640 forces the movable side wall in direction of the base 1412. The insert 1630 is configured to move axially, along the X axis, in the opening 1620 against the return force of the spring 1640 when the movable side wall is pulled back by the user. When the movable side wall is pulled back by the user, the watch reception volume 1500 is expanded and the device 100 may be easily inserted inside the reception volume 1500. When the movable side wall is let free to return to its rest position, the movable side wall contacts the enclosure 110 so as to maintain the device 100 in position.

Figure 20:
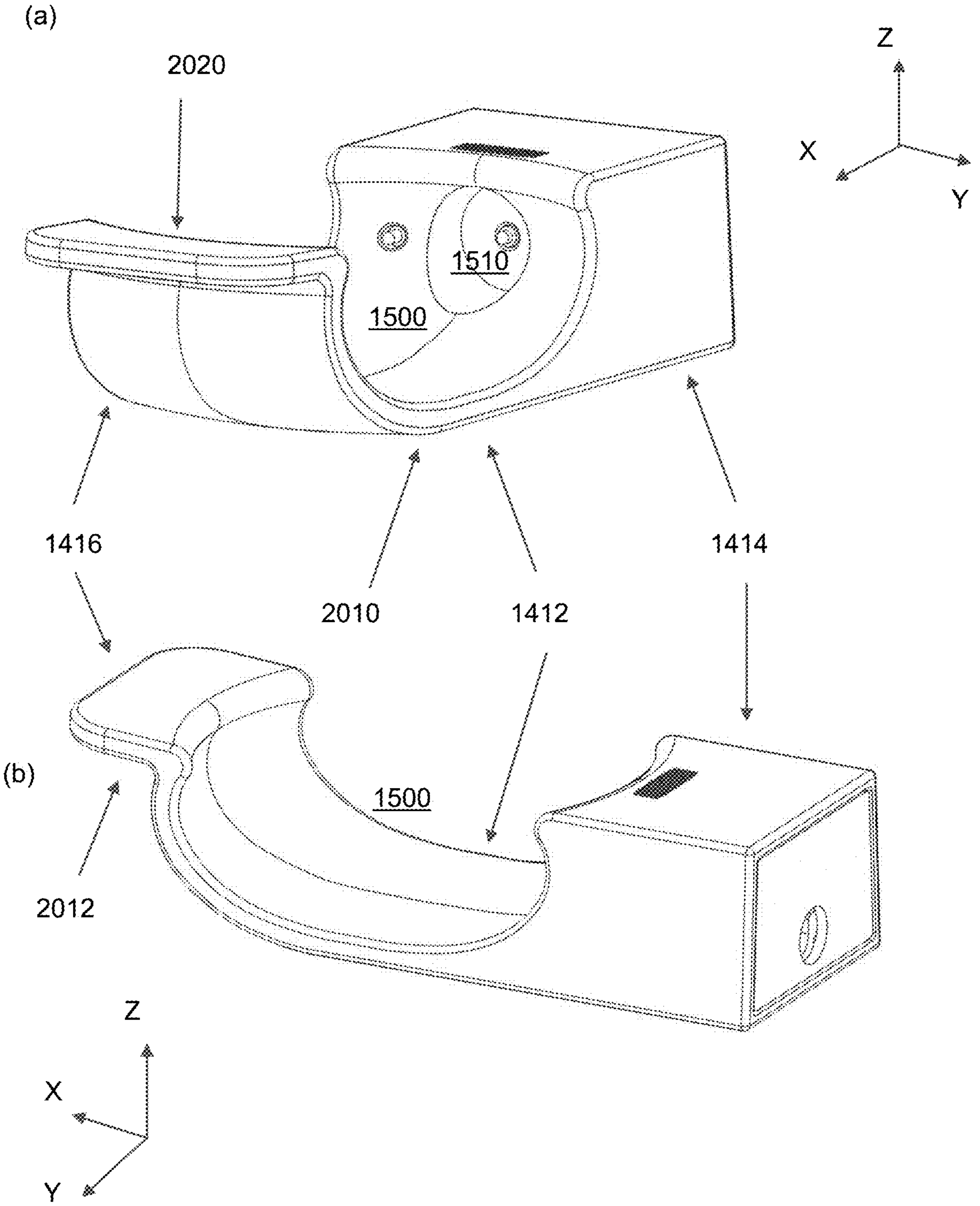
FIG. 20 shows a three-dimensional view of an assembly in the charging configuration according to another embodiment.
Figure 21:
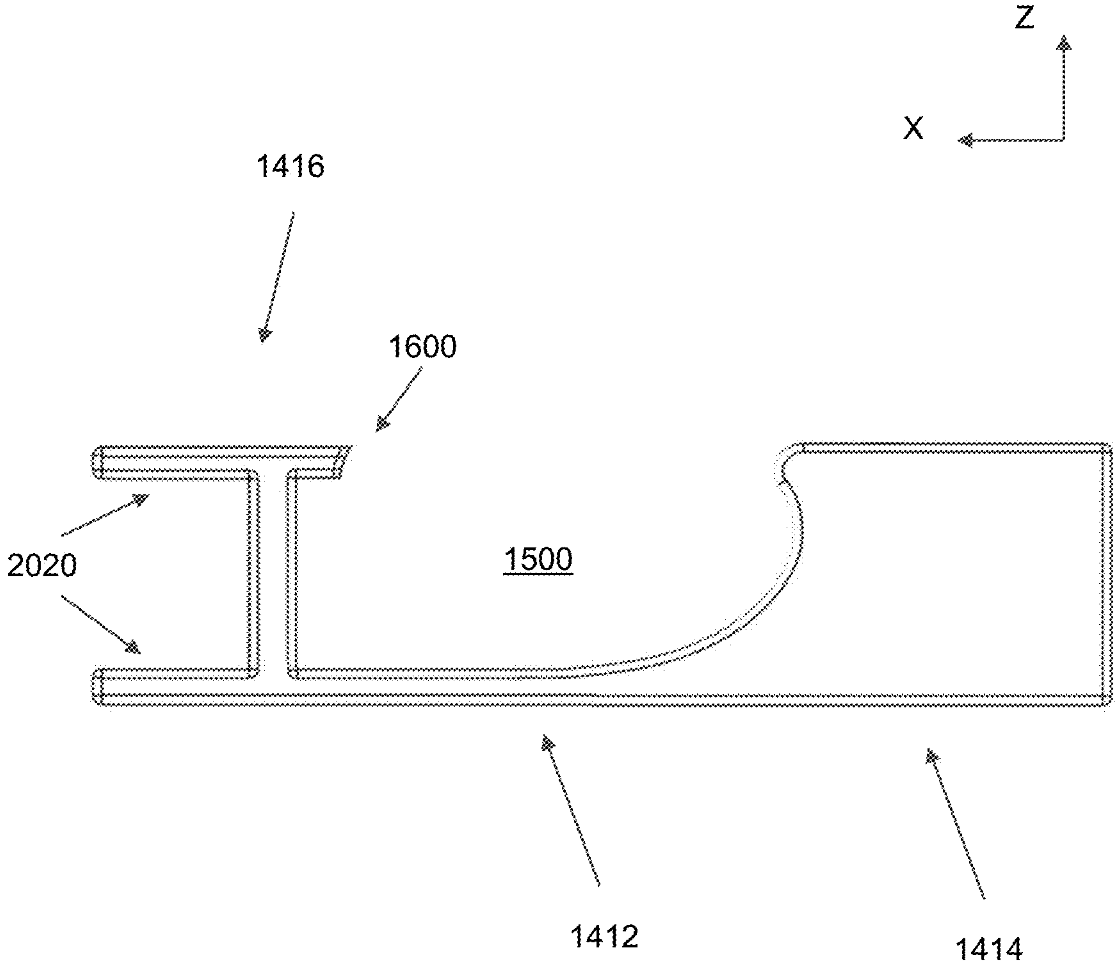
FIG. 21 shows a side view of the charger of the assembly according to another embodiment.

In a variant illustrated on FIG. 20 and in a variant illustrated on FIG. 21, at least one of the side walls is movable by flexion. In the illustrated embodiments, the second side wall 1416 is the flexible side wall. In particular, the flexible side wall comprises a first end 2010 fixed to the base 1412 and a free second end 2012, opposite to the first end 2010. The second end 2012 is configured to be moved with respect to the base 1412, notably along the X axis. To that end, the flexible side wall comprises at least a finger support 2020 arranged at the free second end 2012. In particular, the finger support 2020 extends horizontally from the second end 2012. The finger support 2020 enables the user to easily bend the flexible wall 1416. In the embodiment illustrated on FIG. 21, the flexible side wall comprises two finger supports 2020, respectively arranged at the free second end 2012 and at the first end 2010. The two finger supports 2020 form a clamp enabling the user to bend even more easily the flexible wall 1416. When the flexible side wall is pulled and bended by the user, the watch reception volume 1500 is expanded and the device 100 may be easily inserted inside the watch reception volume 1500. When the flexible side wall is let free to return to its rest position, the flexible side wall contacts the enclosure 110 so as to maintain the device 100 in position.

The user may then remove the device 100 from the charger 900 just by pulling the device 100 slightly, without a need to directly move or bend the side wall.

Figure 22:
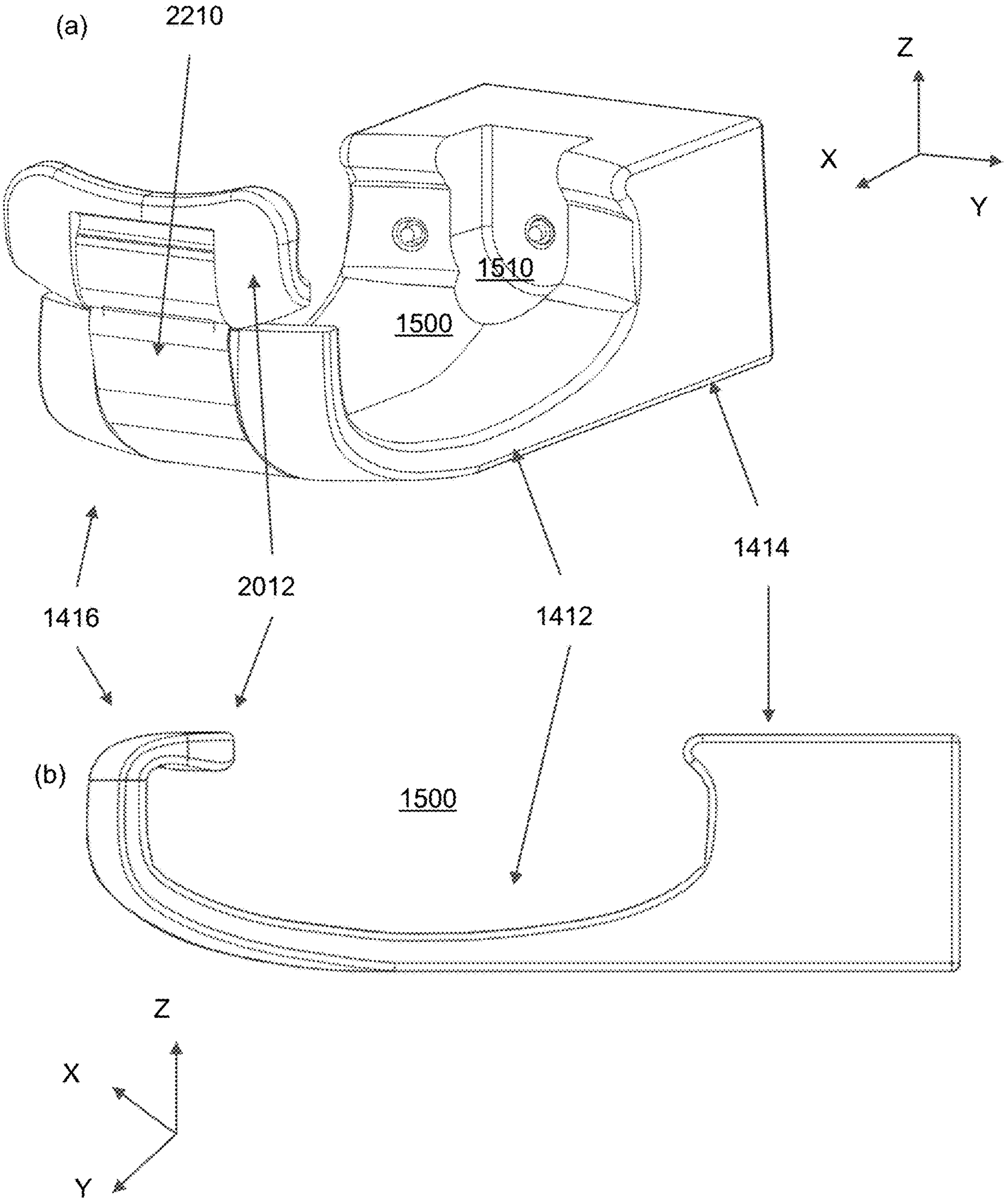
FIG. 22 shows two different three-dimensional views of the charger of the assembly according to another embodiment.

In a variant illustrated on FIG. 22, the movable side wall 1416 may be hinged to the base 1412. In particular, the second side wall 1416 comprise two parts hinged together, a first part being arranged at the first end 2010 and a second part arranged at the free second end 2012. The second side wall 1416 is configured to switch from a deployed configuration, illustrated on FIG. 21(*a*), to a folded configuration, illustrated on FIG. 21(*b*). The second side wall 1416 may comprise a flat spring 2210 extending from the first end 2010 to the second end 2012 and enabling to maintain the side wall 1416 in each configuration. The side wall 1416 is in the deployed configuration when the assembly is in the separated configuration to enable the device to be inserted in the reception volume 1500. The side wall 1416 is in the folded configuration when the assembly is in the charging configuration to maintain the device 100 in position inside the reception volume 1500.

Thanks to the movable side wall, the charger 900 may receive different types of devices. By different type of devices, it is understood devices which present different shapes (e.g., sizes) of enclosures, in particular different widths of enclosures. For example, the charger 900 may be compatible with watches presenting a diameter of 38 mm and with watches presenting a diameter of 42 mm.

One of the side walls may define a crown insertion volume 1510 to receive the crown 120. In particular, the crown 120 is at least partially inserted inside the crown insertion volume 1510 in the charging configuration. The crown insertion volume 1510 enables to maintain the device 100 in the good charging configuration to provide an efficient mechanical and electrical contact between the device 100 and the charger 900.

In a non-illustrated variant, the crown insertion volume 1510 is arranged on the base 1412.

As illustrated on FIGS. 15, 17, 20 and 23, the crown insertion volume 1510 may be an insertion blind hole. The shape of the insertion blind hole may be complimentary from that of the crown 120, with a functional clearance therebetween. For example, when the crown 120 is of circular shape, the insertion blind hole 1510 may be of a circular shape, with slightly bigger a radius (for example between 10% and 50% bigger).

The first electrical connector 1520 may thus be at the bottom of the blind hole, along the direction of insertion of the crown 120 in the blind hole. Alternatively (not illustrated), the first electrical connector 1520 may be on a side of the blind hole and gets deformed along the direction of insertion of the crown 120 in the blind hole when the crown 120 is inserted in the blind hole.

As illustrated on FIGS. 18, 19, 22 and 24, the crown insertion volume 1510 is an insertion slot. The insertion slot may be an open insertion slot. By open, it is meant as open towards the top along the Z axis to allow a vertical insertion of the device 100, by having the crown 120 slide in the slot. Alternatively, the insertion slot could be a closed insertion slot, according to which the slot is not open towards the top along the Z axis. The insertion of the crown 120 in the slot may be possible through a direction transverse to the direction of the slot.

Figure 19:
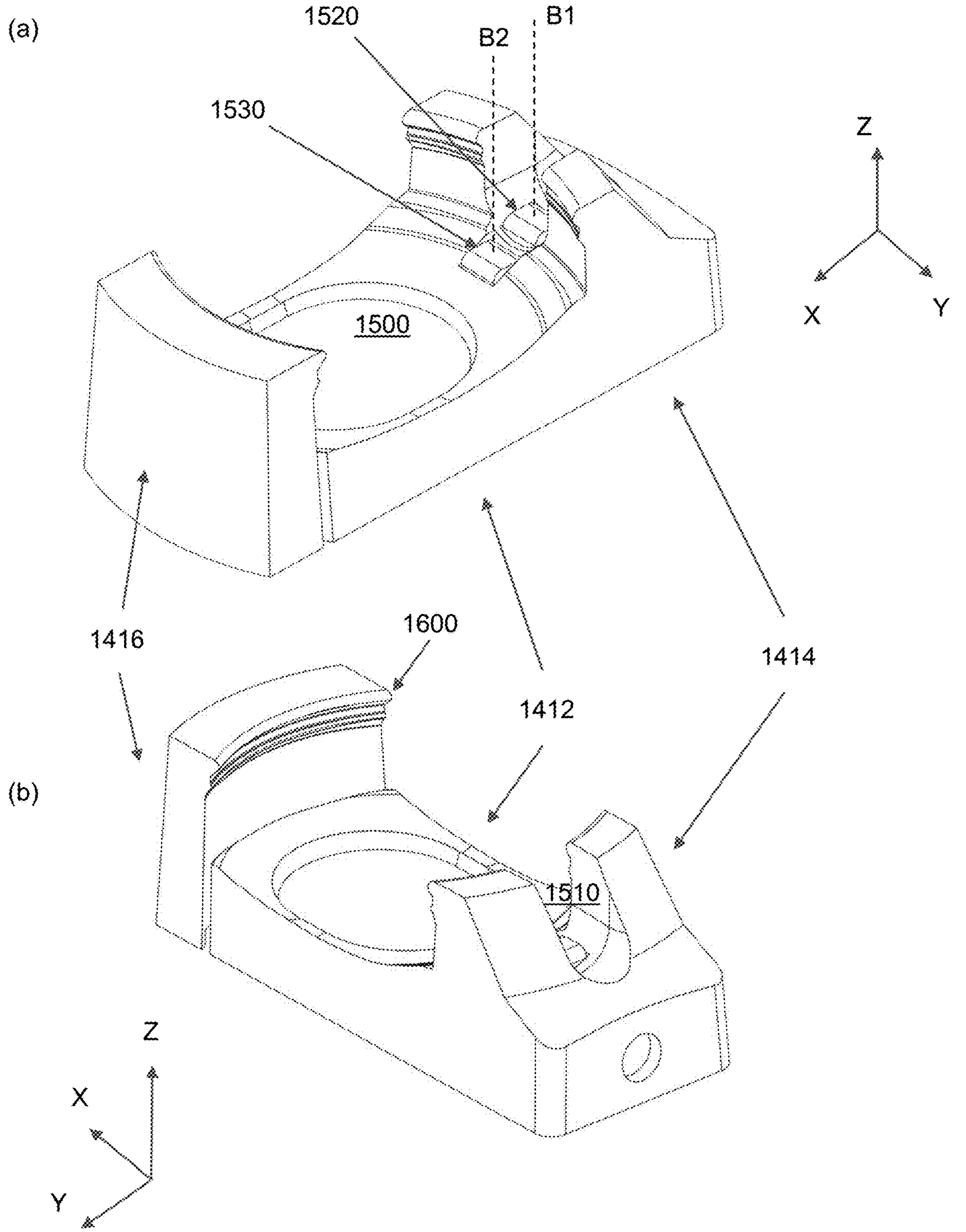
FIG. 19 shows two different three-dimensional views of the charger of the assembly of FIG. 18.

Also, as illustrated on FIGS. 18 and 19, the insertion slot may be a through slot, open in the direction of the crown axis A (when the device 100 is placed in the electric charger 900). Conversely, as illustrated on FIGS. 24, the insertion slot may be a blind slot, closed in the direction of the crown axis A (when the device 100 is placed in the electric charger 900).

The first electrical connector 1520 may thus be at the bottom of the through slot, along the direction of insertion of the crown 120 in the through slot. Alternatively (not illustrated), the first electrical connector 1520 may be on a side of the through slot and gets deformed along the direction of insertion of the crown 120 in the through slot when the crown 120 is inserted in the through slot.

So that the open insertion slot may guide the crown 120 in translation, the dimension of the open insertion slot transversally to the crown axis A may be complimentary of the shape of the crown 120, with a functional clearance therebetween.

Figure 24:
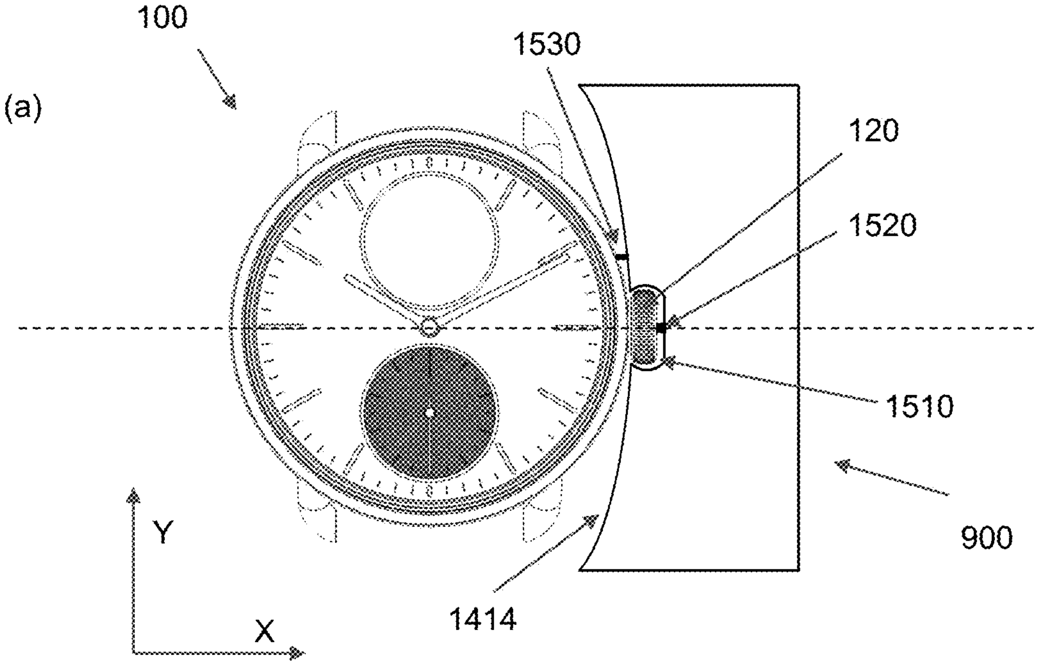
FIG. 24 shows a top view (a) and a side view (b) of the charger of the assembly according to another embodiment.
Figure 24:
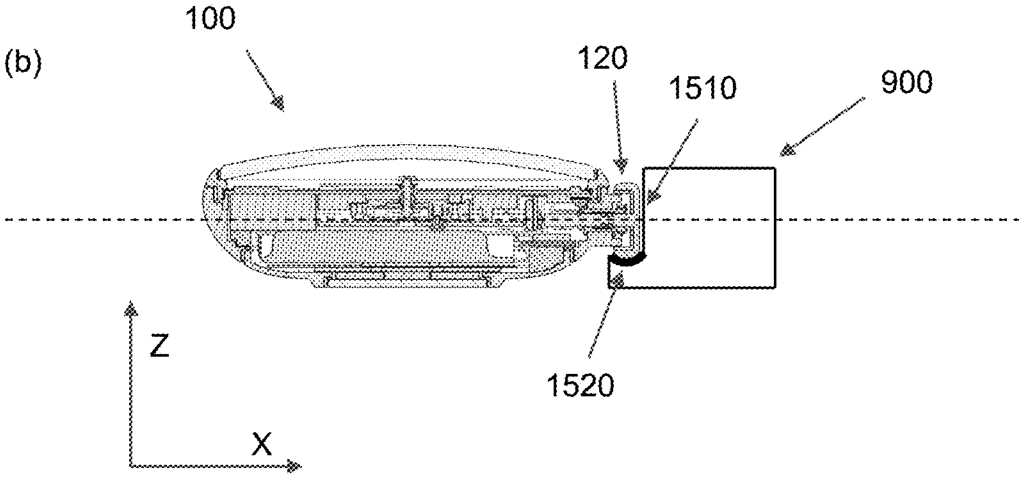

The shape of the insertion slot may also vary. For example, transversally to the direction of insertion of the crown 120 in the insertion slot, the insertion slot may also comprise a dovetail shape so that the crown 120 abuts against the slot when inserted therein. FIG. 24 illustrates such a dovetail shape. Alternatively, transversally to the direction of insertion of the crown 120 in the insertion slot, the insertion slot may comprise a shape which does not prevent the crown to get out. Stated otherwise FIG. 19 illustrates such a shape.

Electrical Connectors

The charger 900 comprises two electrical connectors, in particular a first electrical connector 1520 and a second electrical connector 1530.

The first electrical connector 1520 is configured to be in contact with the crown 120 of the device 100 in the charging configuration.

More precisely, the first electrical connector 1520 may protrude inside the crown insertion volume 1510. In particular, in the charging configuration, the crown 120 is inserted in the crown insertion volume 1510 and is in contact with the first connector 1520.

The first electrical connector 1520 may be deformable along the direction of insertion of the crown in the crown insertion volume. This allows maintaining an electrical contact therebetween. In one implementation, the first electrical connector 1520 is placed at the bottom of the crown insertion volume 1510 along the direction of insertion of the crown 120. In other words, the crown 120 abuts against the first electrical connector 1520 when inserted in the crown insertion volume 1510. For example, as illustrated on FIGS. 15 and 20, the first electrical connector 1520 may extend along the direction and translates or may be compressed along that direction. For example (not illustrated), the first electrical connector 1520 may extend transversally along the direction of insertion but may be deformable along that direction (e.g., a bendable connector).

The second electrical connector 1530 may be similar defined as the first electrical connector 1520, with the same properties as disclosed, except that it is located outside the crow insertion volume 1510.

Figure 15:
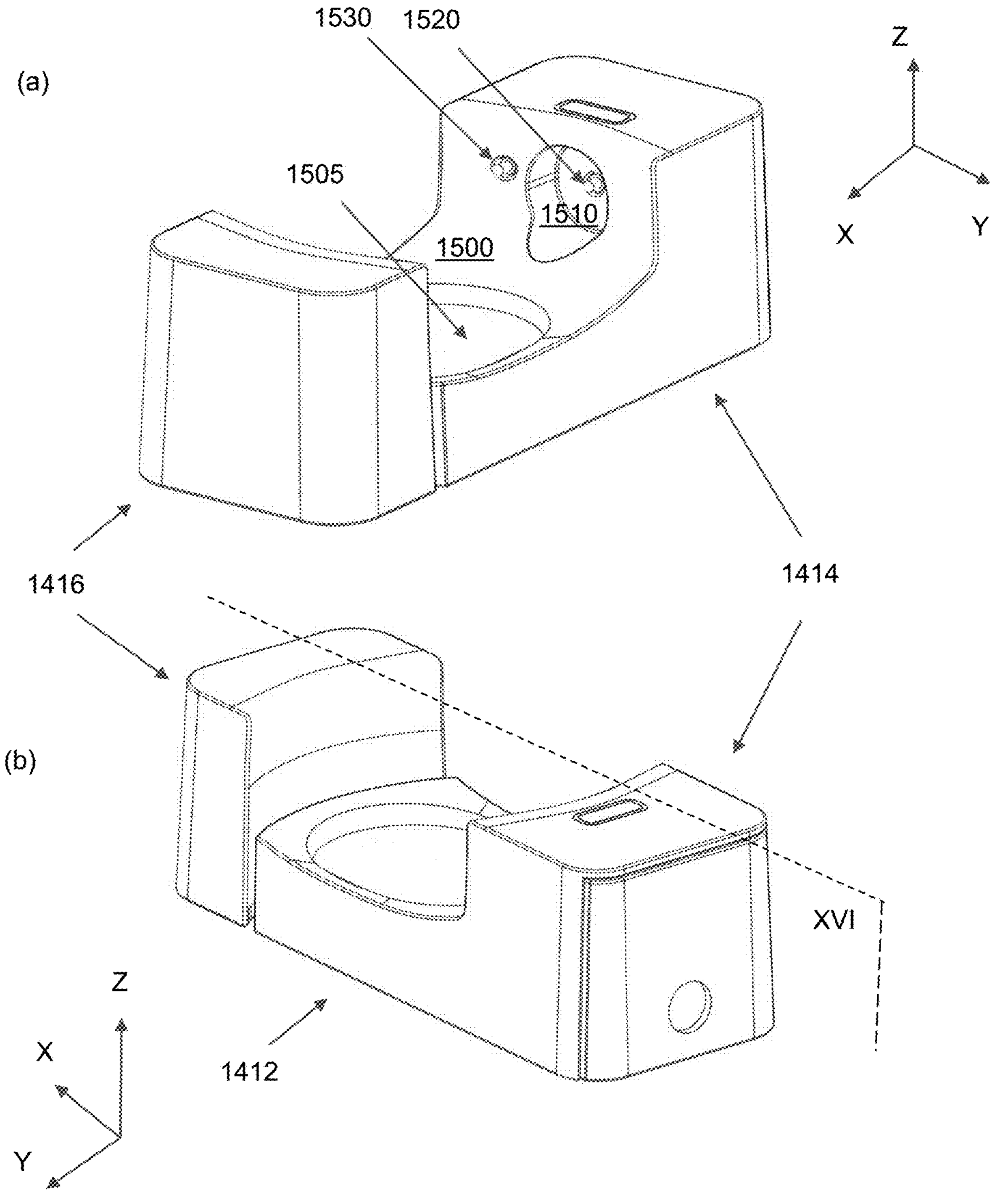
FIG. 15 shows two different three-dimensional views of the charger of the assembly of FIG. 14.

More precisely, in the embodiments illustrated on FIGS. 15 and 20, the first electrical connector 1520 protrudes horizontally from the first side wall 1414 inside the crown insertion volume 1510. By horizontally, it is meant parallel, or essentially parallel, to the crown axis A when the device 100 is placed on the electric charger 900. This configuration allows an insertion of the crown 120 that is along the direction of the first electrical connector 1520. Therefore, this reduces the risk to damage the first electrical connector 1520.

More precisely, in the embodiment illustrated on FIG. 19, the first connector 1520 protrudes vertically from the bottom of the insertion slot 1510, that is to say along the direction of the insertion slot.

The second electrical connector 1530 may be configured to be in contact with the enclosure 110 in the charging configuration, when the enclosure 110 is connected to the second pole of the battery 480. In a variant (not illustrated), the second electrical connector 1530 may be configured to be in contact with the case back 210 in the charging configuration, in the embodiment in which the case back 210 is connected to the second pole of the battery 480.

In the embodiments illustrated on FIGS. 15 and 20, the second electrical connector 1530 is arranged on the same side walls. In particular, the second electrical connector 1530 may be arranged on the first side wall 1414. In particular, the second electrical connector 1530 is arranged next to the crown insertion volume 1510 in a horizontal direction. The second electrical connector 1530 may be sensibly arranged at the same height along the Z axis than the first electrical connector 1530.

In the embodiment illustrated on FIG. 19, the second electrical connector 1530 may be arranged on the base 1412. In particular, the second electrical connector 1530 may be arranged next to the first electrical connector 1520, along the X direction.

The second electrical connector 1530 may also be deformable along the direction of approach of the wearable device.

Each electrical connector 1520, 1530 may be an electrical pin connector. As illustrated on FIGS. 15 and 20, each electrical connector may be a metallic pogo pin. Each electrical connector is in particular a spring-loaded pin comprising an integrated spring in the pin which enables a good mechanical and electrical connection with the device 100.

In a variant, each electrical connector 1520, 1530 may extend from the support 1410 along a respective main axis B1, B2. Each electrical connector may be deformable along the associated main axis B1, B2 and along at least an additional axis different from the associated main axis B1, B2. In other words, contrary to a pogo pin which is only able to move along a single axis, the electrical connector may here move along at least two axes.

In an embodiment illustrated on FIGS. 19 and 24, at least the first electrical connector may be made of a soft conductive material. By "soft" it is understood that it may be deformed by the weight of the device 100 placed on the charger 900. The soft conductive material may be for example a conductive foam, a doped silicone or an elastomer filled with conductive particles. In a variant, the electrical connector may be a spring, in particular an accordion spring able to move along at least two axes. Such an electrical connector prevents scratches on the enclosure which may occur with pins and provides better adaptability and better mechanical contact with different shapes of devices 100 or crown 120, while providing an efficient electrical contact. In one implementation, the second electrical connector is made of the same material.

In a variation, notably illustrated by FIG. 24, the first electrical connector 1520 and the second electrical connector 1530 are made of different material, for example a pin and a soft conductive material.

The two side walls of the charger 900 enables to enclose the device 100 so as to protect it and provides an esthetical impression. The charger 900 provides a good mechanical and electrical contact with the device 100, without a need of magnets. Moreover, the charger 900 may be compatible with multiple types of watches.

Method of Charging

A method of charging a battery 480 of a device 100 with a charger 900 will now be described.

The assembly is initially in the separated configuration, the device 100 being away from the charger 900. The device 100 may be worn at the wrist of the user. The user may follow the level of charge of the battery 480 through the display 136.

When the battery 480 is low or empty, the user may want to recharge the battery 480.

The user then switches the assembly from the separated configuration to the charging configuration. In particular, the user may pull back or bend one of the side walls to enlarge the watch reception volume 1500. The device 100 may be then easily inserted inside the watch reception volume 1500. In particular, the crown 120 is inserted into the insertion volume 1510 and the case back 210 rests on the base 1412.

Then the side wall is then let free by the user and it returns to its rest position. The movable side wall then contacts the enclosure 110 so as to maintain the device 100 in position.

The first electrical connector 1520 is then in contact with the crown 120 and the second electrical connector 1530 is in contact with the enclosure 110 or the case back 210.

The charger 900 then electrically charges the rechargeable battery 480 of the device 100.

The user may follow the recharge level of the battery 480 through the display 136. In addition or in complement, the device 100 may send a notification to an external terminal 820 informing the user when the battery 480 is fully charge.

The user may then switch the assembly from the charging configuration to the separated configuration. In particular, the user may then remove the device 100 from the charger 900 just by pulling the device 100 slightly, without a need to move or bend the side wall.

The device 100 may be again worn at the wrist of the user.

The charging method is therefore simple for the user and enables an efficient charge of the device 100 by providing a good mechanical and electrical contact between the charger 900 and the device 100.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

It will be appreciated that the various embodiments and aspects of the inventions described previously are combinable according to any technically permissible combinations.

The invention claimed is:

1. A wearable device configured to be positioned on a user's wrist, the wearable device comprising:
- a rechargeable battery configured to provide energy for the wearable device, the rechargeable battery comprising a first pole and a second pole,
- an enclosure,
- a crown protruding through the enclosure, the crown being a hardware input for the user, and
- a case back configured to be at least partially in contact with the skin of the wrist,
- wherein the crown is configured to be electrically connected to the first pole and wherein the enclosure is configured to be electrically connected to the second pole.

2. The device according to claim 1, wherein the first pole is a positive pole, and the second pole is a negative pole connected to a ground plane.

3. The device according to claim 1, wherein the enclosure and the case back are two electrically independent parts.

4. The device according to claim 1, wherein the crown is a push-button, the crown being configured to switch from a pressed configuration to a rest configuration, the crown being connected to the first pole when the crown is in the rest configuration.

5. The device according to claim 1, wherein the crown is disconnected from the first pole when the push-button is in the pressed configuration.

6. The device according to claim 1, wherein the crown comprises a head arranged outside the enclosure and a stem extending through the enclosure, the head and the stem being electrically conductive, the head and the stem being configured to be electrically connected to the first pole.

7. The device according to claim 6, wherein the device comprises an isolation ring configured to electrically isolate the head of the crown from the enclosure.

8. The device according to claim 6, wherein the device comprises an isolation sleeve configured to isolate the stem of the crown from the enclosure.

9. The device according to claim 1, wherein the device comprises a circuit board electrically arranged respectively between the first pole and the crown, the crown being connected to the circuit board through a flexible printed circuit.

10. The device according to claim 9, wherein the circuit board is electrically arranged between the second pole and the enclosure, the enclosure being directly connected to the circuit board through a conductive contact.

11. The device according to claim 9, wherein the flexible printed circuit comprises a hook shaped extremity configured to cooperate with the stem to electrically connect the crown to the flexible printed circuit.

12. The device according to claim 9, wherein the device comprises a seal configured to electrically isolate the flexible printed circuit from the enclosure.

13. The device according to claim 7, wherein the flexible printed circuit is connected to at least one of:
- an altimeter,
- an ECG electrode,
- a temperature sensor, a PPG sensor, a stem rotation detector.

14. The device according to claim 1, wherein the device comprises a battery charging module configured to control the charging of the rechargeable battery and comprising an input port and a battery output port, the crown being connected to the input port and the rechargeable battery being connected to the battery output port.

15. The device according to claim 1, wherein the device comprises at least two ECG electrodes and an ECG module, electrically connected to the ECG electrodes and configured to perform an electrocardiogram.

16. The device according to claim 15, wherein the case back comprises a first ECG electrode.

17. The device according to claim 15, wherein the device comprises a bezel mounted on the enclosure and made of electrically conductive material, the bezel comprising a second ECG electrode.

18. The device according to claim 1, wherein the case back comprises a physiological sensor, the physiological sensor being a photoplethysmography sensor and/or a temperature sensor.

19. An assembly comprising a wearable device according to claim 1 and an electric charger, the assembly being configured to switch from a separated configuration in which the charger is away from the device to a charging configuration in which the charger cooperates with the device to electrically charge the rechargeable battery.

20. A method of charging with an assembly according to claim 19, wherein the assembly is initially in the separated configuration, the method comprising:

switching the assembly from the separated configuration to the charging configuration, and electrically charging the rechargeable battery of the device by the charger.

* * * * *